United States Patent
Yoo et al.

(10) Patent No.: US 11,483,587 B2
(45) Date of Patent: Oct. 25, 2022

(54) VIDEO ENCODING/DECODING METHOD AND DEVICE USING BDPCM, AND METHOD FOR TRANSMITTING BITSTREAM

(71) Applicant: LG Electronics Inc., Seoul (KR)

(72) Inventors: Sunmi Yoo, Seoul (KR); Jin Heo, Seoul (KR); Jangwon Choi, Seoul (KR); Jungah Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/502,946

(22) Filed: Oct. 15, 2021

(65) Prior Publication Data

US 2022/0109872 A1 Apr. 7, 2022

Related U.S. Application Data

(63) Continuation of application No. PCT/KR2020/005141, filed on Apr. 17, 2020.
(Continued)

(51) Int. Cl.
*H04N 19/11* (2014.01)
*H04N 19/176* (2014.01)
(Continued)

(52) U.S. Cl.
CPC ........... *H04N 19/593* (2014.11); *H04N 19/11* (2014.11); *H04N 19/136* (2014.11); *H04N 19/176* (2014.11)

(58) Field of Classification Search
CPC .......... H04N 9/11; H04N 9/136; H04N 9/176; H04N 9/593
See application file for complete search history.

(56) References Cited

U.S. PATENT DOCUMENTS

| 2014/0362917 A1* | 12/2014 | Joshi | H04N 19/129 375/240.12 |
| 2015/0381982 A1 | 12/2015 | Oh et al. | |
| 2021/0392338 A1* | 12/2021 | Xu | H04N 19/117 |

FOREIGN PATENT DOCUMENTS

| KR | 10-2010-0009718 | 1/2010 |
| KR | 10-2018-0008797 | 1/2018 |
| KR | 10-2018-0041774 | 4/2018 |

OTHER PUBLICATIONS

Clare, G. et al., "CE8: BDPCM with harmonized residual coding and CCB limitation (CE8-3.1a, CE8-3.1b, CE8-5.1a, CE8-5.1b)," JVET-N0214, Joint Video Experts Team (JVET) of ITU-T SG 16 WP 3 and ISO/IEC JTC 1/SC 29/WG 11, 14th Meeting, Geneva, CH, Mar. 19-27, 2019, 12 pages.

* cited by examiner

*Primary Examiner* — Tsion B Owens
(74) *Attorney, Agent, or Firm* — Fish & Richardson P.C.

(57) ABSTRACT

An image encoding/decoding method and apparatus are provided. An image decoding method according to the present disclosure may include parsing, from a bitstream, first information specifying whether block difference pulse code modulation (BDPCM) applies to an intra-predicted current block, determining a prediction direction of BDPCM for the current block and generating a residual block of the current block based on the determined prediction direction of BDPCM, based on the first information specifying that BDPCM applies to the current block, generating a prediction block of the current block, by performing intra prediction based on an intra prediction mode of the current block, and reconstructing the current block based on the residual block and the prediction block.

13 Claims, 25 Drawing Sheets

Related U.S. Application Data

(60) Provisional application No. 62/847,909, filed on May 14, 2019, provisional application No. 62/834,976, filed on Apr. 17, 2019.

(51) Int. Cl.
*H04N 19/593* (2014.01)
*H04N 19/136* (2014.01)

FIG. 13

| $Q(r_{0,0})$ | $Q(r_{1,0}) -Q(r_{0,0})$ | ⋮ | $Q(r_{M-2,0}) -Q(r_{M-3,0})$ | $Q(r_{M-1,0}) -Q(r_{M-2,0})$ |
|---|---|---|---|---|
| $Q(r_{0,1})$ | $Q(r_{1,1}) -Q(r_{0,1})$ | ⋮ | $Q(r_{M-2,1}) -Q(r_{M-3,1})$ | $Q(r_{M-1,1}) -Q(r_{M-2,1})$ |
| ⋮ | ⋮ | ⋮ | ⋮ | ⋮ |
| $Q(r_{0,N-2})$ | $Q(r_{1,N-2}) -Q(r_{0,N-2})$ | ⋮ | $Q(r_{M-2,N-2}) -Q(r_{M-3,N-2})$ | $Q(r_{M-1,N-2}) -Q(r_{M-2,N-2})$ |
| $Q(r_{0,N-1})$ | $Q(r_{1,N-1}) -Q(r_{0,N-1})$ | ⋮ | $Q(r_{M-2,N-1}) -Q(r_{M-3,N-1})$ | $Q(r_{M-1,N-1}) -Q(r_{M-2,N-1})$ |

Horizontal BDPCM

| $Q(r_{0,0})$ | $Q(r_{1,0})$ | ⋮ | $Q(r_{M-2,0})$ | $Q(r_{M-1,0})$ |
|---|---|---|---|---|
| $Q(r_{0,1}) -Q(r_{0,0})$ | $Q(r_{1,1}) -Q(r_{1,0})$ | ⋮ | $Q(r_{M-2,1}) -Q(r_{M-2,0})$ | $Q(r_{M-1,1}) -Q(r_{M-1,0})$ |
| ⋮ | ⋮ | ⋮ | ⋮ | ⋮ |
| $Q(r_{0,N-2}) -Q(r_{0,N-3})$ | $Q(r_{1,N-2}) -Q(r_{1,N-3})$ | ⋮ | $Q(r_{M-2,N-2}) -Q(r_{M-2,N-3})$ | $Q(r_{M-1,N-2}) -Q(r_{M-1,N-3})$ |
| $Q(r_{0,N-1}) -Q(r_{0,N-2})$ | $Q(r_{1,N-1}) -Q(r_{1,N-2})$ | ⋮ | $Q(r_{M-2,N-1}) -Q(r_{M-2,N-2})$ | $Q(r_{M-1,N-1}) -Q(r_{M-1,N-2})$ |

Vertical BDPCM

| if( CuPredMode[ x0 ][ y0 ]  ==  MODE_INTRA ) { | |
|---|---|
| if( pred_mode_flag  ==  MODE_INTRA && ( cIdx == 0 ) && ( cbWidth <= 32 ) && ( CbHeight <= 32 )) { | |
| bdpcm_flag[ x0 ][ y0 ] | ae(v) |
| if( bdpcm_flag[ x0 ][ y0 ] ) { | |
| bdpcm_dir_flag[ x0 ][ y0 ] | ae(v) | ered # VIDEO ENCODING/DECODING METHOD AND DEVICE USING BDPCM, AND METHOD FOR TRANSMITTING BITSTREAM

CROSS-REFERENCE TO RELATED APPLICATIONS

This application is a continuation of International Application No. PCT/KR2020/005141, filed on Apr. 17, 2020, which claims the benefit of U.S. Provisional Application Nos. 62/847,909, filed on May 14, 2019, and 62/834,976, filed on Apr. 17, 2019. The disclosures of the prior applications are incorporated by reference in their entirety.

TECHNICAL FIELD

The present disclosure relates to an image encoding/decoding method and apparatus and, more particularly, to a method and apparatus for encoding/decoding an image using block difference pulse code modulation (BDPCM) and a method of transmitting a bitstream generated by the image encoding method/apparatus of the present disclosure.

BACKGROUND

Recently, demand for high-resolution and high-quality images such as high definition (HD) images and ultra high definition (UHD) images is increasing in various fields. As resolution and quality of image data are improved, the amount of transmitted information or bits relatively increases as compared to existing image data. An increase in the amount of transmitted information or bits causes an increase in transmission cost and storage cost.

Accordingly, there is a need for high-efficient image compression technology for effectively transmitting, storing and reproducing information on high-resolution and high-quality images.

SUMMARY

An object of the present disclosure is to provide an image encoding/decoding method and apparatus with improved encoding/decoding efficiency.

Another object of the present disclosure is to provide a method and apparatus for encoding/decoding an image using BDPCM.

Another object of the present disclosure is to provide an image encoding/decoding method and apparatus capable of efficiently signaling BDPCM-related information.

Another object of the present disclosure is to provide an image encoding/decoding method and apparatus for performing BDPCM after deriving a prediction direction of BDPCM based on an intra prediction mode or a size of a block.

Another object of the present disclosure is to provide an image encoding/decoding method and apparatus capable of efficiently encoding a residual signal of a block to which BDPCM applies.

Another object of the present disclosure is to provide a method of transmitting a bitstream generated by an image encoding method or apparatus according to the present disclosure.

Another object of the present disclosure is to provide a recording medium storing a bitstream generated by an image encoding method or apparatus according to the present disclosure.

Another object of the present disclosure is to provide a recording medium storing a bitstream received, decoded and used to reconstruct an image by an image decoding apparatus according to the present disclosure.

The technical problems solved by the present disclosure are not limited to the above technical problems and other technical problems which are not described herein will become apparent to those skilled in the art from the following description.

An image decoding method according to an aspect of the present disclosure is performed by an image decoding apparatus. The image decoding method comprises parsing, from a bitstream, first information specifying whether block difference pulse code modulation (BDPCM) applies to an intra-predicted current block, determining a prediction direction of BDPCM for the current block and generating a residual block of the current block based on the determined prediction direction of BDPCM, based on the first information specifying that BDPCM applies to the current block, generating a prediction block of the current block, by performing intra prediction based on an intra prediction mode of the current block, and reconstructing the current block based on the residual block and the prediction block.

In the image decoding method according to the present disclosure, the first information may be parsed only based on a non-zero residual signal being present in the current block, and, based on the non-zero residual signal being not present in the current block, parsing of the first information may be skipped and it may be determined that BDPCM does not applies to the current block.

In the image decoding method according to the present disclosure, whether the non-zero residual signal is present in the current block may be determined based on information parsed from the bitstream.

In the image decoding method according to the present disclosure, the prediction direction of BDPCM may be determined based on second information parsed from the bitstream.

In the image decoding method according to the present disclosure, the prediction direction of BDPCM and a prediction direction of the intra prediction mode may be the same.

In the image decoding method according to the present disclosure, the prediction direction of BDPCM may be determined based on the intra prediction mode.

In the image decoding method according to the present disclosure, the prediction direction of BDPCM may be determined to be a vertical direction, based on the prediction direction of the intra prediction mode being a vertical direction, the prediction direction of BDPCM may be determined to be a horizontal direction, based on the prediction direction of the intra prediction mode being a horizontal direction, and the prediction direction of BDPCM may be determined to be a predetermined direction, based on the prediction direction of the intra prediction mode being a non-directional mode.

In the image decoding method according to the present disclosure, the predetermined direction may be a predefined direction or a direction derived based on information signaled at a higher level of the current block.

In the image decoding method according to the present disclosure, the prediction direction of BDPCM may be determined based on a size of the current block.

In the image decoding method according to the present disclosure, in case a width of the current block is W and a height is H, the prediction direction of BDPCM may be determined to be a horizontal direction based on W being greater than H, and the prediction direction of BDPCM may be determined to be a vertical direction based on H being greater than W.

In the image decoding method according to the present disclosure, in case a width of the current block is W and a height is H, the prediction direction of BDPCM may be determined to be a vertical direction based on W/H being equal to or greater than a predetermined integer N, and the prediction direction of BDPCM may be determined to be a horizontal direction based on W/H being equal to or less than 1/N.

An image decoding apparatus according to another embodiment of the present disclosure may comprise a memory and at least one processor, wherein the at least one processor is configured to parse, from a bitstream, first information specifying whether block difference pulse code modulation (BDPCM) applies to an intra-predicted current block, determine a prediction direction of BDPCM for the current block and generate a residual block of the current block based on the determined prediction direction of BDPCM, based on the first information specifying that BDPCM applies to the current block, generate a prediction block of the current block, by performing intra prediction based on an intra prediction mode of the current block, and reconstruct the current block based on the residual block and the prediction block.

An image encoding method according to another aspect of the present disclosure may include determining whether block difference pulse code modulation (BDPCM) applies to a current block, determining a prediction direction of BDPCM for the current block based on BDPCM applying to the current block, generating a prediction block of the current block, by performing intra prediction, based on an intra prediction mode of the current block, generating a residual block of the current block based on the prediction block, encoding a residual block of the current block based on the determined prediction direction of BDPCM, and encoding first information specifying whether BDPCM applies to the current block.

In the image encoding method according to the present disclosure, the prediction direction of BDPCM and a prediction direction of the intra prediction mode may be the same.

A transmission method according to another aspect of the present disclosure may transmit a bitstream generated by the image encoding apparatus or the image encoding method of the present disclosure.

A computer-readable recording medium according to another aspect of the present disclosure may store a bitstream generated by the image encoding apparatus or the image encoding method of the present disclosure.

The features briefly summarized above with respect to the present disclosure are merely exemplary aspects of the detailed description below of the present disclosure, and do not limit the scope of the present disclosure.

According to the present disclosure, it is possible to provide an image encoding/decoding method and apparatus with improved encoding/decoding efficiency.

According to the present disclosure, it is possible to provide a method and apparatus for encoding/decoding an image using BDPCM.

According to the present disclosure, it is possible to provide an image encoding/decoding method and apparatus capable of efficiently signaling BDPCM-related information.

According to the present disclosure, it is possible to provide an image encoding/decoding method and apparatus for performing BDPCM after deriving a prediction direction of BDPCM based on an intra prediction mode or a size of a block.

According to the present disclosure, it is possible to provide an image encoding/decoding method and apparatus capable of efficiently encoding a residual signal of a block to which BDPCM applies.

Also, according to the present disclosure, it is possible to provide a method of transmitting a bitstream generated by an image encoding method or apparatus according to the present disclosure.

Also, according to the present disclosure, it is possible to provide a recording medium storing a bitstream generated by an image encoding method or apparatus according to the present disclosure.

Also, according to the present disclosure, it is possible to provide a recording medium storing a bitstream received, decoded and used to reconstruct an image by an image decoding apparatus according to the present disclosure.

It will be appreciated by persons skilled in the art that that the effects that can be achieved through the present disclosure are not limited to what has been particularly described hereinabove and other advantages of the present disclosure will be more clearly understood from the detailed description.

BRIEF DESCRIPTION OF THE DRAWINGS

FIG. 13 is a view illustrating a modified quantized residual block generated by performing BDPCM of the present disclosure.

DETAILED DESCRIPTION

Figure 1:
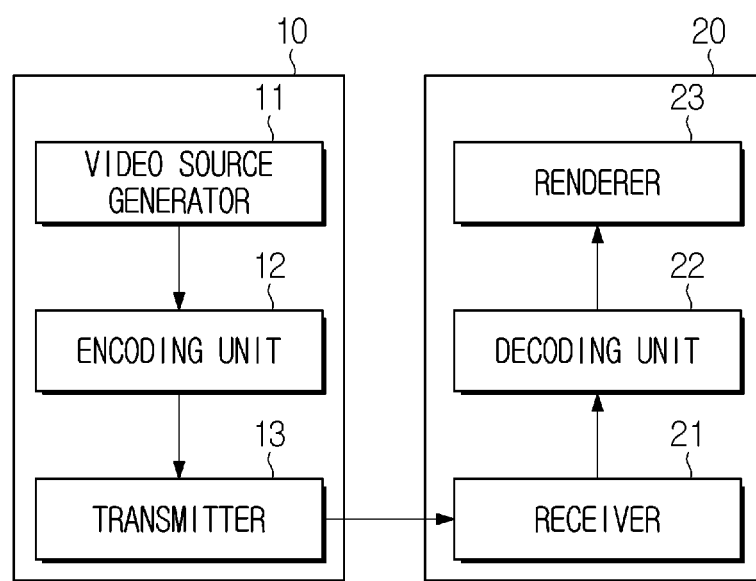
FIG. 1 is a view schematically showing a video coding system, to which an embodiment of the present disclosure is applicable.

Hereinafter, the embodiments of the present disclosure will be described in detail with reference to the accompanying drawings so as to be easily implemented by those skilled in the art. However, the present disclosure may be implemented in various different forms, and is not limited to the embodiments described herein.

In describing the present disclosure, in case it is determined that the detailed description of a related known function or construction renders the scope of the present disclosure unnecessarily ambiguous, the detailed description thereof will be omitted. In the drawings, parts not related to the description of the present disclosure are omitted, and similar reference numerals are attached to similar parts.

In the present disclosure, when a component is "connected", "coupled" or "linked" to another component, it may include not only a direct connection relationship but also an indirect connection relationship in which an intervening component is present. In addition, when a component "includes" or "has" other components, it means that other components may be further included, rather than excluding other components unless otherwise stated.

In the present disclosure, the terms first, second, etc. may be used only for the purpose of distinguishing one component from other components, and do not limit the order or importance of the components unless otherwise stated. Accordingly, within the scope of the present disclosure, a first component in one embodiment may be referred to as a second component in another embodiment, and similarly, a second component in one embodiment may be referred to as a first component in another embodiment.

In the present disclosure, components that are distinguished from each other are intended to clearly describe each feature, and do not mean that the components are necessarily separated. That is, a plurality of components may be integrated and implemented in one hardware or software unit, or one component may be distributed and implemented in a plurality of hardware or software units. Therefore, even if not stated otherwise, such embodiments in which the components are integrated or the component is distributed are also included in the scope of the present disclosure.

In the present disclosure, the components described in various embodiments do not necessarily mean essential components, and some components may be optional components. Accordingly, an embodiment consisting of a subset of components described in an embodiment is also included in the scope of the present disclosure. In addition, embodiments including other components in addition to components described in the various embodiments are included in the scope of the present disclosure.

The present disclosure relates to encoding and decoding of an image, and terms used in the present disclosure may have a general meaning commonly used in the technical field, to which the present disclosure belongs, unless newly defined in the present disclosure.

In the present disclosure, a "picture" generally refers to a unit representing one image in a specific time period, and a slice/tile/subpicture is a coding unit constituting a part of a picture, and one picture may be composed of one or more slices/tiles/subpictures. In addition, a slice/tile/subpicture may include one or more coding tree units (CTUs).

In the present disclosure, a "pixel" or a "pel" may mean a smallest unit constituting one picture (or image). In addition, "sample" may be used as a term corresponding to a pixel. A sample may generally represent a pixel or a value of a pixel, and may represent only a pixel/pixel value of a luma component or only a pixel/pixel value of a chroma component.

In the present disclosure, a "unit" may represent a basic unit of image processing. The unit may include at least one of a specific region of the picture and information related to the region. The unit may be used interchangeably with terms such as "sample array", "block" or "area" in some cases. In a general case, an M×N block may include samples (or sample arrays) or a set (or array) of transform coefficients of M columns and N rows.

In the present disclosure, "current block" may mean one of "current coding block", "current coding unit", "coding target block", "decoding target block" or "processing target block". When prediction is performed, "current block" may mean "current prediction block" or "prediction target block". When transform (inverse transform)/quantization (dequantization) is performed, "current block" may mean "current transform block" or "transform target block". When filtering is performed, "current block" may mean "filtering target block".

In addition, in the present disclosure, a "current block" may mean "a luma block of a current block" unless explicitly stated as a chroma block. The "chroma block of the current block" may be expressed by including an explicit description of a chroma block, such as "chroma block" or "current chroma block".

In the present disclosure, the term "/" and "," should be interpreted to indicate "and/or." For instance, the expression "A/B" and "A, B" may mean "A and/or B." Further, "A/B/C" and "A/B/C" may mean "at least one of A, B, and/or C."

In the present disclosure, the term "or" should be interpreted to indicate "and/or." For instance, the expression "A or B" may comprise 1) only "A", 2) only "B", and/or 3) both "A and B". In other words, in the present disclosure, the term "or" should be interpreted to indicate "additionally or alternatively."

Overview of Video Coding System

FIG. 1 is a view showing a video coding system according to the present disclosure.

The video coding system according to an embodiment may include a encoding apparatus 10 and a decoding apparatus 20. The encoding apparatus 10 may deliver encoded video and/or image information or data to the decoding apparatus 20 in the form of a file or streaming via a digital storage medium or network.

The encoding apparatus 10 according to an embodiment may include a video source generator 11, an encoding unit 12 and a transmitter 13. The decoding apparatus 20 according to an embodiment may include a receiver 21, a decoding unit 22 and a renderer 23. The encoding unit 12 may be called a video/image encoding unit, and the decoding unit 22 may be called a video/image decoding unit. The transmitter 13 may be included in the encoding unit 12. The receiver 21 may be included in the decoding unit 22. The renderer 23 may include a display and the display may be configured as a separate device or an external component.

The video source generator 11 may acquire a video/image through a process of capturing, synthesizing or generating the video/image. The video source generator 11 may include a video/image capture device and/or a video/image generating device. The video/image capture device may include, for example, one or more cameras, video/image archives including previously captured video/images, and the like. The video/image generating device may include, for example, computers, tablets and smartphones, and may (electronically) generate video/images. For example, a virtual video/image may be generated through a computer or the like. In this case, the video/image capturing process may be replaced by a process of generating related data.

The encoding unit 12 may encode an input video/image. The encoding unit 12 may perform a series of procedures such as prediction, transform, and quantization for compression and coding efficiency. The encoding unit 12 may output encoded data (encoded video/image information) in the form of a bitstream.

The transmitter 13 may transmit the encoded video/image information or data output in the form of a bitstream to the receiver 21 of the decoding apparatus 20 through a digital storage medium or a network in the form of a file or streaming. The digital storage medium may include various storage mediums such as USB, SD, CD, DVD, Blu-ray, HDD, SSD, and the like. The transmitter 13 may include an element for generating a media file through a predetermined file format and may include an element for transmission through a broadcast/communication network. The receiver 21 may extract/receive the bitstream from the storage medium or network and transmit the bitstream to the decoding unit 22.

The decoding unit 22 may decode the video/image by performing a series of procedures such as dequantization, inverse transform, and prediction corresponding to the operation of the encoding unit 12.

The renderer 23 may render the decoded video/image. The rendered video/image may be displayed through the display.

Overview of Image Encoding Apparatus

Figure 2:
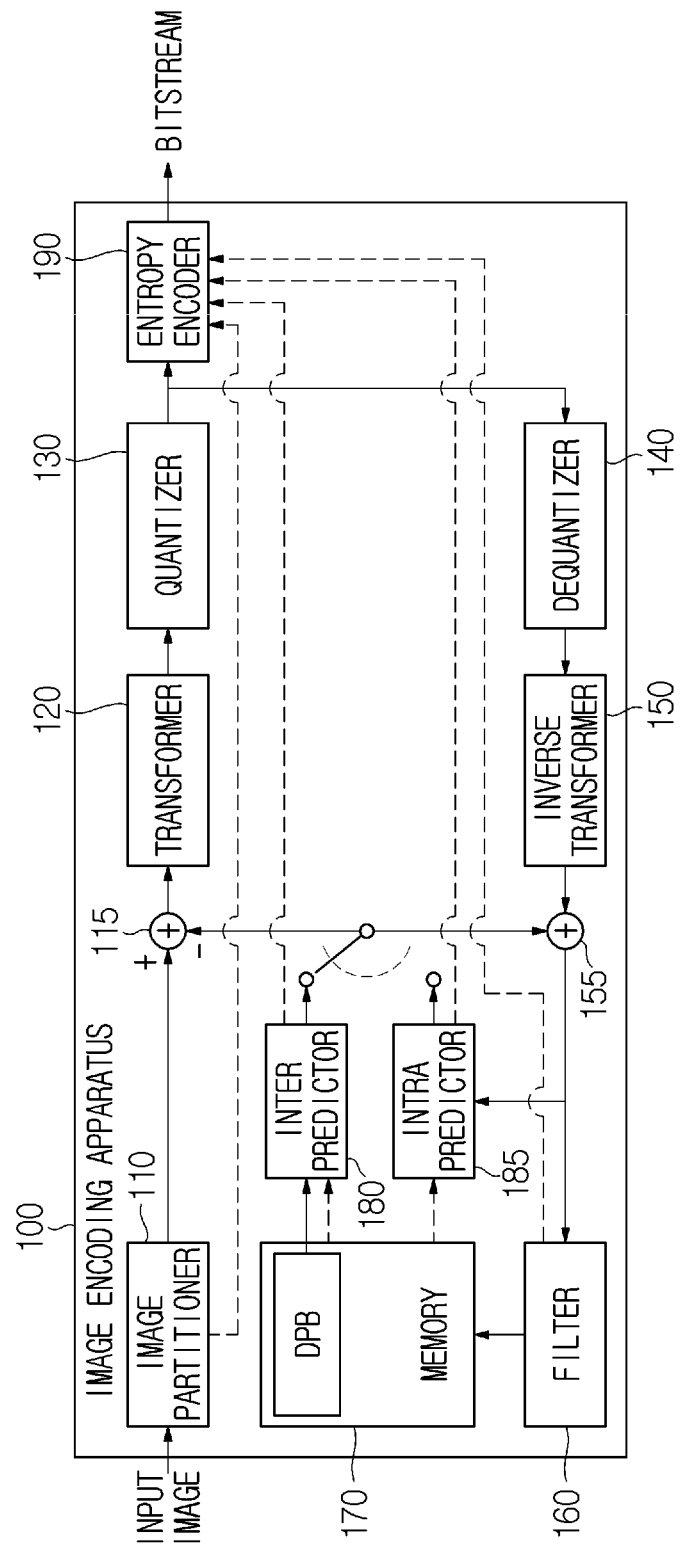
FIG. 2 is a view schematically showing an image encoding apparatus, to which an embodiment of the present disclosure is applicable.

FIG. 2 is a view schematically showing an image encoding apparatus, to which an embodiment of the present disclosure is applicable.

As shown in FIG. 2, the image encoding apparatus 100 may include an image partitioner 110, a subtractor 115, a transformer 120, a quantizer 130, a dequantizer 140, an inverse transformer 150, an adder 155, a filter 160, a memory 170, an inter prediction unit 180, an intra prediction unit 185 and an entropy encoder 190. The inter prediction unit 180 and the intra prediction unit 185 may be collectively referred to as a "prediction unit". The transformer 120, the quantizer 130, the dequantizer 140 and the inverse transformer 150 may be included in a residual processor. The residual processor may further include the subtractor 115.

All or at least some of the plurality of components configuring the image encoding apparatus 100 may be configured by one hardware component (e.g., an encoder or a processor) in some embodiments. In addition, the memory 170 may include a decoded picture buffer (DPB) and may be configured by a digital storage medium.

The image partitioner 110 may partition an input image (or a picture or a frame) input to the image encoding apparatus 100 into one or more processing units. For example, the processing unit may be called a coding unit (CU). The coding unit may be acquired by recursively partitioning a coding tree unit (CTU) or a largest coding unit (LCU) according to a quad-tree binary-tree ternary-tree (QT/BT/TT) structure. For example, one coding unit may be partitioned into a plurality of coding units of a deeper depth based on a quad tree structure, a binary tree structure, and/or a ternary structure. For partitioning of the coding unit, a quad tree structure may be applied first and the binary tree structure and/or ternary structure may be applied later. The coding procedure according to the present disclosure may be performed based on the final coding unit that is no longer partitioned. The largest coding unit may be used as the final coding unit or the coding unit of deeper depth acquired by partitioning the largest coding unit may be used as the final coding unit. Here, the coding procedure may include a procedure of prediction, transform, and reconstruction, which will be described later. As another example, the processing unit of the coding procedure may be a prediction unit (PU) or a transform unit (TU). The prediction unit and the transform unit may be split or partitioned from the final coding unit. The prediction unit may be a unit of sample prediction, and the transform unit may be a unit for deriving a transform coefficient and/or a unit for deriving a residual signal from the transform coefficient.

The prediction unit (the inter prediction unit 180 or the intra prediction unit 185) may perform prediction on a block to be processed (current block) and generate a predicted block including prediction samples for the current block.

The prediction unit may determine whether intra prediction or inter prediction is applied on a current block or CU basis. The prediction unit may generate various information related to prediction of the current block and transmit the generated information to the entropy encoder 190. The information on the prediction may be encoded in the entropy encoder 190 and output in the form of a bitstream.

The intra prediction unit 185 may predict the current block by referring to the samples in the current picture. The referred samples may be located in the neighborhood of the current block or may be located apart according to the intra prediction mode and/or the intra prediction technique. The intra prediction modes may include a plurality of non-directional modes and a plurality of directional modes. The non-directional mode may include, for example, a DC mode and a planar mode. The directional mode may include, for example, 33 directional prediction modes or 65 directional prediction modes according to the degree of detail of the prediction direction. However, this is merely an example, more or less directional prediction modes may be used depending on a setting. The intra prediction unit 185 may determine the prediction mode applied to the current block by using a prediction mode applied to a neighboring block.

The inter prediction unit 180 may derive a predicted block for the current block based on a reference block (reference sample array) specified by a motion vector on a reference picture. In this case, in order to reduce the amount of motion information transmitted in the inter prediction mode, the motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. The reference picture including the reference block and the reference picture including the temporal neighboring block may be the same or different. The temporal neighboring block may be called a collocated reference block, a co-located CU (colCU), and the like. The reference picture including the temporal neighboring block may be called a collocated picture (colPic). For example, the inter prediction unit 180 may configure a motion information candidate list based on neighboring blocks and generate information indicating which candidate is used to derive a motion vector and/or a reference picture index of the current block. Inter prediction may be performed based on various prediction modes. For example, in the case of a skip mode and a merge mode, the inter prediction unit 180 may use motion information of the neighboring block as motion information of the current block. In the case of the skip mode, unlike the merge mode, the residual signal may not be transmitted. In the case of the motion vector prediction (MVP) mode, the motion vector of the neighboring block may be used as a motion vector predictor, and the motion vector of the current block may be signaled by encoding a motion vector difference and an indicator for a motion vector predictor. The motion vector difference may mean a difference between the motion vector of the current block and the motion vector predictor.

The prediction unit may generate a prediction signal based on various prediction methods and prediction techniques described below. For example, the prediction unit may not only apply intra prediction or inter prediction but also simultaneously apply both intra prediction and inter prediction, in order to predict the current block. A prediction method of simultaneously applying both intra prediction and inter prediction for prediction of the current block may be called combined inter and intra prediction (CIIP). In addition, the prediction unit may perform intra block copy (IBC) for prediction of the current block. Intra block copy may be used for content image/video coding of a game or the like, for example, screen content coding (SCC). IBC is a method of predicting a current picture using a previously reconstructed reference block in the current picture at a location apart from the current block by a predetermined distance. When IBC is applied, the location of the reference block in the current picture may be encoded as a vector (block vector) corresponding to the predetermined distance. In IBC, prediction is basically performed in the current picture, but may be performed similarly to inter prediction in that a reference block is derived within the current picture. That is, IBC may use at least one of the inter prediction techniques described in the present disclosure.

The prediction signal generated by the prediction unit may be used to generate a reconstructed signal or to generate a residual signal. The subtractor 115 may generate a residual signal (residual block or residual sample array) by subtracting the prediction signal (predicted block or prediction sample array) output from the prediction unit from the input image signal (original block or original sample array). The generated residual signal may be transmitted to the transformer 120.

The transformer 120 may generate transform coefficients by applying a transform technique to the residual signal. For example, the transform technique may include at least one of a discrete cosine transform (DCT), a discrete sine transform (DST), a karhunen-loève transform (KLT), a graph-based transform (GBT), or a conditionally non-linear transform (CNT). Here, the GBT means transform obtained from a graph when relationship information between pixels is represented by the graph. The CNT refers to transform acquired based on a prediction signal generated using all previously reconstructed pixels. In addition, the transform process may be applied to square pixel blocks having the same size or may be applied to blocks having a variable size rather than square.

The quantizer 130 may quantize the transform coefficients and transmit them to the entropy encoder 190. The entropy encoder 190 may encode the quantized signal (information on the quantized transform coefficients) and output a bitstream. The information on the quantized transform coefficients may be referred to as residual information. The quantizer 130 may rearrange quantized transform coefficients in a block form into a one-dimensional vector form based on a coefficient scanning order and generate information on the quantized transform coefficients based on the quantized transform coefficients in the one-dimensional vector form.

The entropy encoder 190 may perform various encoding methods such as, for example, exponential Golomb, context-adaptive variable length coding (CAVLC), context-adaptive binary arithmetic coding (CABAC), and the like. The entropy encoder 190 may encode information necessary for video/image reconstruction other than quantized transform coefficients (e.g., values of syntax elements, etc.) together or separately. Encoded information (e.g., encoded video/image information) may be transmitted or stored in units of network abstraction layers (NALs) in the form of a bitstream. The video/image information may further include information on various parameter sets such as an adaptation parameter set (APS), a picture parameter set (PPS), a sequence parameter set (SPS), or a video parameter set (VPS). In addition, the video/image information may further include general constraint information. The signaled information, transmitted information and/or syntax elements described in the present disclosure may be encoded through the above-described encoding procedure and included in the bitstream.

The bitstream may be transmitted over a network or may be stored in a digital storage medium. The network may include a broadcasting network and/or a communication network, and the digital storage medium may include various storage media such as USB, SD, CD, DVD, Blu-ray, HDD, SSD, and the like. A transmitter (not shown) transmitting a signal output from the entropy encoder 190 and/or a storage unit (not shown) storing the signal may be included as internal/external element of the image encoding apparatus 100. Alternatively, the transmitter may be provided as the component of the entropy encoder 190.

The quantized transform coefficients output from the quantizer 130 may be used to generate a residual signal. For example, the residual signal (residual block or residual samples) may be reconstructed by applying dequantization and inverse transform to the quantized transform coefficients through the dequantizer 140 and the inverse transformer 150.

The adder 155 adds the reconstructed residual signal to the prediction signal output from the inter prediction unit 180 or the intra prediction unit 185 to generate a reconstructed signal (reconstructed picture, reconstructed block, reconstructed sample array). In case there is no residual for the block to be processed, such as a case where the skip mode is applied, the predicted block may be used as the reconstructed block. The adder 155 may be called a reconstructor or a reconstructed block generator. The generated reconstructed signal may be used for intra prediction of a next block to be processed in the current picture and may be used for inter prediction of a next picture through filtering as described below.

The filter 160 may improve subjective/objective image quality by applying filtering to the reconstructed signal. For example, the filter 160 may generate a modified reconstructed picture by applying various filtering methods to the reconstructed picture and store the modified reconstructed picture in the memory 170, specifically, a DPB of the memory 170. The various filtering methods may include, for example, deblocking filtering, a sample adaptive offset, an adaptive loop filter, a bilateral filter, and the like. The filter 160 may generate various information related to filtering and transmit the generated information to the entropy encoder 190 as described later in the description of each filtering method. The information related to filtering may be encoded by the entropy encoder 190 and output in the form of a bitstream.

The modified reconstructed picture transmitted to the memory 170 may be used as the reference picture in the inter prediction unit 180. When inter prediction is applied through the image encoding apparatus 100, prediction mismatch between the image encoding apparatus 100 and the image decoding apparatus may be avoided and encoding efficiency may be improved.

The DPB of the memory 170 may store the modified reconstructed picture for use as a reference picture in the inter prediction unit 180. The memory 170 may store the motion information of the block from which the motion information in the current picture is derived (or encoded) and/or the motion information of the blocks in the picture that have already been reconstructed. The stored motion information may be transmitted to the inter prediction unit 180 and used as the motion information of the spatial neighboring block or the motion information of the temporal neighboring block. The memory 170 may store reconstructed samples of reconstructed blocks in the current picture and may transfer the reconstructed samples to the intra prediction unit 185.

Overview of Image Decoding Apparatus

Figure 3:
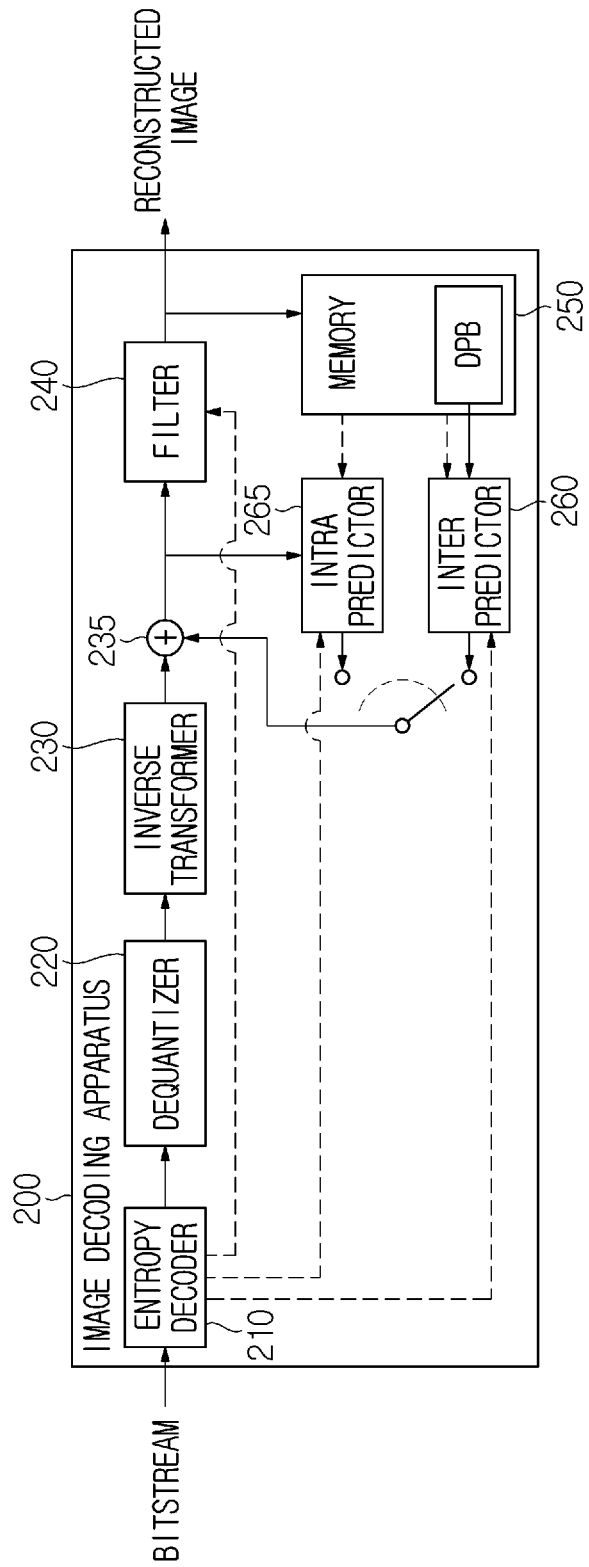
FIG. 3 is a view schematically showing an image decoding apparatus, to which an embodiment of the present disclosure is applicable.

FIG. 3 is a view schematically showing an image decoding apparatus, to which an embodiment of the present disclosure is applicable.

As shown in FIG. 3, the image decoding apparatus 200 may include an entropy decoder 210, a dequantizer 220, an inverse transformer 230, an adder 235, a filter 240, a memory 250, an inter prediction unit 260 and an intra prediction unit 265. The inter prediction unit 260 and the intra prediction unit 265 may be collectively referred to as a "prediction unit". The dequantizer 220 and the inverse transformer 230 may be included in a residual processor.

All or at least some of a plurality of components configuring the image decoding apparatus 200 may be configured by a hardware component (e.g., a decoder or a processor) according to an embodiment. In addition, the memory 250 may include a decoded picture buffer (DPB) or may be configured by a digital storage medium.

The image decoding apparatus 200, which has received a bitstream including video/image information, may reconstruct an image by performing a process corresponding to a process performed by the image encoding apparatus 100 of FIG. 2. For example, the image decoding apparatus 200 may perform decoding using a processing unit applied in the image encoding apparatus. Thus, the processing unit of decoding may be a coding unit, for example. The coding unit may be acquired by partitioning a coding tree unit or a largest coding unit. The reconstructed image signal decoded and output through the image decoding apparatus 200 may be reproduced through a reproducing apparatus (not shown).

The image decoding apparatus 200 may receive a signal output from the image encoding apparatus of FIG. 2 in the form of a bitstream. The received signal may be decoded through the entropy decoder 210. For example, the entropy decoder 210 may parse the bitstream to derive information (e.g., video/image information) necessary for image reconstruction (or picture reconstruction). The video/image information may further include information on various parameter sets such as an adaptation parameter set (APS), a picture parameter set (PPS), a sequence parameter set (SPS), or a video parameter set (VPS). In addition, the video/image information may further include general constraint information. The image decoding apparatus may further decode picture based on the information on the parameter set and/or the general constraint information. Signaled/received information and/or syntax elements described in the present disclosure may be decoded through the decoding procedure and obtained from the bitstream. For example, the entropy decoder 210 decodes the information in the bitstream based on a coding method such as exponential Golomb coding, CAVLC, or CABAC, and output values of syntax elements required for image reconstruction and quantized values of transform coefficients for residual. More specifically, the CABAC entropy decoding method may receive a bin corresponding to each syntax element in the bitstream, determine a context model using a decoding target syntax element information, decoding information of a neighboring block and a decoding target block or information of a symbol/bin decoded in a previous stage, and perform arithmetic decoding on the bin by predicting a probability of occurrence of a bin according to the determined context model, and generate a symbol corresponding to the value of each syntax element. In this case, the CABAC entropy decoding method may update the context model by using the information of the decoded symbol/bin for a context model of a next symbol/bin after determining the context model. The information related to the prediction among the information decoded by the entropy decoder 210 may be provided to the prediction unit (the inter prediction unit 260 and the intra prediction unit 265), and the residual value on which the entropy decoding was performed in the entropy decoder 210, that is, the quantized transform coefficients and related parameter information, may be input to the dequantizer 220. In addition, information on filtering among information decoded by the entropy decoder 210 may be provided to the filter 240. Meanwhile, a receiver (not shown) for receiving a signal output from the image encoding apparatus may be further configured as an internal/external element of the image decoding apparatus 200, or the receiver may be a component of the entropy decoder 210.

Meanwhile, the image decoding apparatus according to the present disclosure may be referred to as a video/image/picture decoding apparatus. The image decoding apparatus may be classified into an information decoder (video/image/picture information decoder) and a sample decoder (video/image/picture sample decoder). The information decoder may include the entropy decoder 210. The sample decoder may include at least one of the dequantizer 220, the inverse transformer 230, the adder 235, the filter 240, the memory 250, the inter prediction unit 260 or the intra prediction unit 265.

The dequantizer 220 may dequantize the quantized transform coefficients and output the transform coefficients. The dequantizer 220 may rearrange the quantized transform coefficients in the form of a two-dimensional block. In this case, the rearrangement may be performed based on the coefficient scanning order performed in the image encoding apparatus. The dequantizer 220 may perform dequantization on the quantized transform coefficients by using a quantization parameter (e.g., quantization step size information) and obtain transform coefficients.

The inverse transformer 230 may inversely transform the transform coefficients to obtain a residual signal (residual block, residual sample array).

The prediction unit may perform prediction on the current block and generate a predicted block including prediction samples for the current block. The prediction unit may determine whether intra prediction or inter prediction is applied to the current block based on the information on the prediction output from the entropy decoder 210 and may determine a specific intra/inter prediction mode (prediction technique).

It is the same as described in the prediction unit of the image encoding apparatus 100 that the prediction unit may generate the prediction signal based on various prediction methods (techniques) which will be described later.

The intra prediction unit 265 may predict the current block by referring to the samples in the current picture. The description of the intra prediction unit 185 is equally applied to the intra prediction unit 265.

The inter prediction unit 260 may derive a predicted block for the current block based on a reference block (reference sample array) specified by a motion vector on a reference picture. In this case, in order to reduce the amount of motion information transmitted in the inter prediction mode, motion information may be predicted in units of blocks, subblocks, or samples based on correlation of motion information between the neighboring block and the current block. The motion information may include a motion vector and a reference picture index. The motion information may further include inter prediction direction (L0 prediction, L1 prediction, Bi prediction, etc.) information. In the case of inter prediction, the neighboring block may include a spatial neighboring block present in the current picture and a temporal neighboring block present in the reference picture. For example, the inter prediction unit 260 may configure a motion information candidate list based on neighboring blocks and derive a motion vector of the current block and/or a reference picture index based on the received candidate selection information. Inter prediction may be performed based on various prediction modes, and the information on the prediction may include information indicating a mode of inter prediction for the current block.

The adder 235 may generate a reconstructed signal (reconstructed picture, reconstructed block, reconstructed sample array) by adding the obtained residual signal to the prediction signal (predicted block, predicted sample array) output from the prediction unit (including the inter prediction unit 260 and/or the intra prediction unit 265). The description of the adder 155 is equally applicable to the adder 235. In case there is no residual for the block to be processed, such as when the skip mode is applied, the predicted block may be used as the reconstructed block. The description of the adder 155 is equally applicable to the adder 235. The adder 235 may be called a reconstructor or a reconstructed block generator. The generated reconstructed signal may be used for intra prediction of a next block to be processed in the current picture and may be used for inter prediction of a next picture through filtering as described below.

The filter 240 may improve subjective/objective image quality by applying filtering to the reconstructed signal. For example, the filter 240 may generate a modified reconstructed picture by applying various filtering methods to the reconstructed picture and store the modified reconstructed picture in the memory 250, specifically, a DPB of the memory 250. The various filtering methods may include, for example, deblocking filtering, a sample adaptive offset, an adaptive loop filter, a bilateral filter, and the like.

The (modified) reconstructed picture stored in the DPB of the memory 250 may be used as a reference picture in the inter prediction unit 260. The memory 250 may store the motion information of the block from which the motion information in the current picture is derived (or decoded) and/or the motion information of the blocks in the picture that have already been reconstructed. The stored motion information may be transmitted to the inter prediction unit 260 so as to be utilized as the motion information of the spatial neighboring block or the motion information of the temporal neighboring block. The memory 250 may store reconstructed samples of reconstructed blocks in the current picture and transfer the reconstructed samples to the intra prediction unit 265.

In the present disclosure, the embodiments described in the filter 160, the inter prediction unit 180, and the intra prediction unit 185 of the image encoding apparatus 100 may be equally or correspondingly applied to the filter 240, the inter prediction unit 260, and the intra prediction unit 265 of the image decoding apparatus 200.

Overview of Image Decoding/Encoding Procedure

In image/video coding, a picture configuring an image/video may be encoded/decoded according to a series of decoding order. A picture order corresponding to an output order of the decoded picture may be set differently from the above decoding order, and, based on this, not only forward prediction but also backward prediction may be performed during inter prediction.

Figure 4:
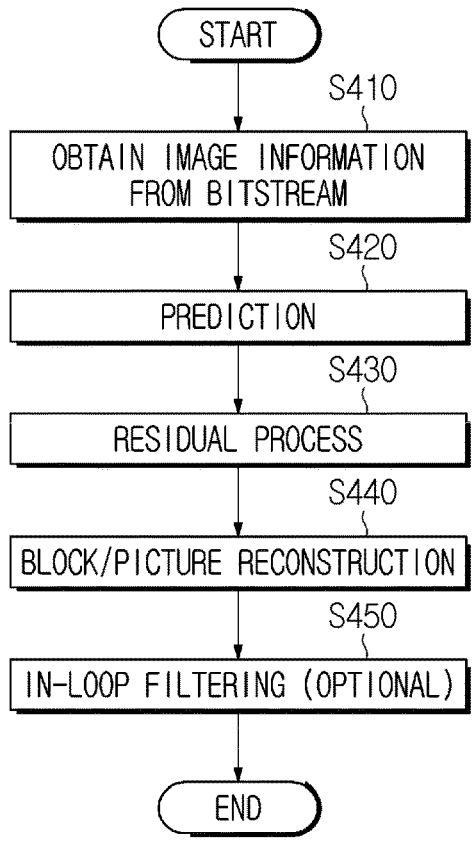
FIG. 4 is a schematic flowchart of an image decoding procedure, to which an embodiment of the present disclosure is applicable.

FIG. 4 is a schematic flowchart of an image decoding procedure, to which an embodiment of the present disclosure is applicable.

Each procedure shown in FIG. 4 may be performed by the image decoding apparatus of FIG. 3. For example, step S410 may be performed by the entropy decoder 210 of the image decoding apparatus, step S420 may be performed by the prediction units 260 and 265, step S430 may be performed by the residual processors 220 and 230, step S440 may be performed by the adder 235, and step S450 may be performed by the filter 240. Step S410 may include the information decoding (parsing) procedure described in the present disclosure, step S420 may include the inter/intra prediction procedure described in the present disclosure, step S430 may include a residual processing procedure described in the present disclosure, step S440 may include the block/picture reconstruction procedure described in the present disclosure, and step S450 may include the in-loop filtering procedure described in the present disclosure.

Referring to FIG. 4, the picture decoding procedure may schematically include a procedure (S410) for obtaining video/image information (through decoding) from a bitstream, an image (picture) reconstruction procedure (S420 to S440) and an in-loop filtering procedure (S450) for a reconstructed image (picture). The image reconstruction procedure may be performed based on prediction samples obtained through inter/intra prediction (S420) and residual samples obtained residual processing (S430) (dequantization and inverse transform for the quantized transform coefficient). A modified reconstructed picture may be generated through the in-loop filtering procedure (S450) for the reconstructed picture generated through the image reconstruction procedure, the modified reconstructed picture may be output as a decoded picture, stored in a decoded picture buffer (DPB) 250 or memory of the image decoding apparatus and used as a reference picture in the inter prediction procedure when decoding later picture. In some cases, the in-loop filtering procedure may be omitted. In this case, the reconstructed picture may be output as a decoded picture, stored in a DPB 250 or memory of the image decoding apparatus, and used as a reference picture in the inter prediction procedure when decoding later picture. The in-loop filtering procedure (S450) may include a deblocking filtering procedure, a sample adaptive offset (SAO) procedure, an adaptive loop filter (ALF) procedure and/or a bi-lateral filter procedure, as described above, some or all of which may be omitted. In addition, one or some of the deblocking filtering procedure, the sample adaptive offset (SAO) procedure, the adaptive loop filter (ALF) procedure and/or the bi-lateral filter procedure may be sequentially applied or all of them may be sequentially applied. For example, after the deblocking filtering procedure applies to the reconstructed picture, the SAO procedure may be performed. Alternatively, after the deblocking filtering procedure applies to the reconstructed picture, the ALF procedure may be performed. This may be similarly performed even in the image encoding apparatus.

Figure 5:
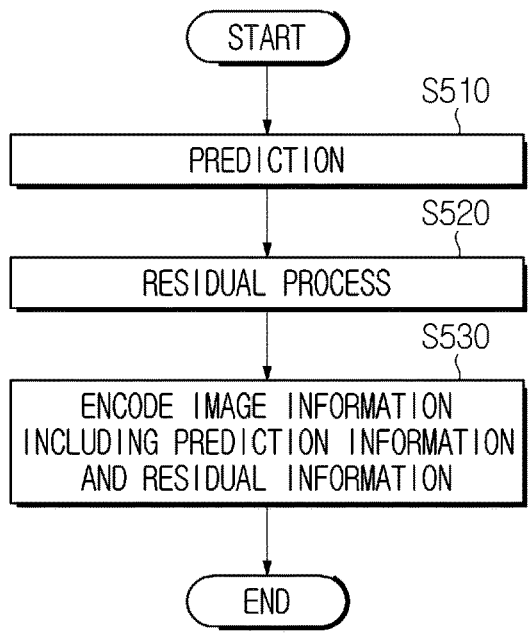
FIG. 5 is a schematic flowchart of an image encoding procedure, to which an embodiment of the present disclosure is applicable.

FIG. 5 is a schematic flowchart of an image encoding procedure, to which an embodiment of the present disclosure is applicable.

Each procedure shown in FIG. 4 may be performed by the image encoding apparatus of FIG. 2. For example, step S510 may be performed by the prediction units 180 and 185 of the image encoding apparatus, step S520 may be performed by the residual processors 115, 120 and 130, and step S530 may be performed in the entropy encoder 190. Step S510 may include the inter/intra prediction procedure described in the present disclosure, step S520 may include the residual processing procedure described in the present disclosure, and step S530 may include the information encoding procedure described in the present disclosure.

Referring to FIG. 5, the image encoding procedure may schematically include not only a procedure for encoding and outputting information for picture reconstruction (e.g., prediction information, residual information, partitioning information, etc.) in the form of a bitstream but also a procedure for generating a reconstructed picture for a current picture and a procedure (optional) for applying in-loop filtering to a reconstructed picture. The image encoding apparatus may derive (modified) residual samples from a quantized transform coefficient through the dequantizer 140 and the inverse transformer 150, and generate the reconstructed picture based on the prediction samples which are output of step S510 and the (modified) residual samples. The reconstructed picture generated in this way may be equal to the reconstructed picture generated in the image decoding apparatus. The modified reconstructed picture may be generated through the in-loop filtering procedure for the reconstructed picture and may be stored in the decoded picture buffer (DPB) 170 or memory, and may be used as a reference picture in the inter prediction procedure when encoding later picture, similarly to the image decoding apparatus. As described above, in some cases, some or all of the in-loop filtering procedure may be omitted. When the in-loop filtering procedure is performed, (in-loop) filtering related information (parameter) may be encoded in the entropy encoder 190 and output in the form of a bitstream, and the image decoding apparatus may perform the in-loop filtering procedure using the same method as the image encoding apparatus based on the filtering related information.

Through such an in-loop filtering procedure, noise occurring during video/image coding, such as blocking artifact and ringing artifact, may be reduced and subjective/objective visual quality may be improved. In addition, by performing the in-loop filtering procedure in both the image encoding apparatus and the image decoding apparatus, the image encoding apparatus and the image decoding apparatus may derive the same prediction result, picture coding reliability may be increased and the amount of data to be transmitted for picture coding may be reduced.

As described above, the image (picture) reconstruction procedure may be performed not only in the image decoding apparatus but also in the image encoding apparatus. A reconstructed block may be generated based on intra prediction/inter prediction in units of blocks, and a reconstructed picture including reconstructed blocks may be generated. When a current picture/slice/tile group is an I picture/slice/tile group, blocks included in the current picture/slice/tile group may be reconstructed based on only intra prediction. On the other hand, when the current picture/slice/tile group is a P or B picture/slice/tile group, blocks included in the current picture/slice/tile group may be reconstructed based on intra prediction or inter prediction. In this case, inter prediction may apply to some blocks in the current picture/slice/tile group and intra prediction may apply to the remaining blocks. The color component of the picture may include a luma component and a chroma component and the methods and embodiments of the present disclosure are applicable to both the luma component and the chroma component unless explicitly limited in the present disclosure.

Overview of Intra Prediction

Hereinafter, intra prediction according to an embodiment will be described.

Intra prediction may indicate prediction which generates prediction samples for a current block based on reference samples in a picture to which the current block belongs (hereinafter referred to as a current picture). When intra prediction applies to the current block, neighboring reference samples to be used for intra prediction of the current block may be derived. The neighboring reference samples of the current block may include a sample adjacent to a left boundary of the current block having a size of nW×nH and a total of 2×nH samples adjacent to the bottom-left, a sample adjacent to a top boundary of the current block and a total of 2×nW samples adjacent to the top-right, and one sample adjacent to the top-left of the current block. Alternatively, the neighboring reference samples of the current block may include a plurality of columns of top neighboring samples and a plurality of rows of left neighboring samples. In addition, the neighboring reference samples of the current block may include a total of nH samples adjacent to a right boundary of the current block having a size of nW×nH, a total of nW samples adjacent to a bottom boundary of the current block, and one sample adjacent to the bottom-right of the current block.

Some of the neighboring reference samples of the current block have not yet been decoded or may not be available. In this case, a decoder may construct neighboring reference samples to be used for prediction, by substituting unavailable samples with available samples. Alternatively, neighboring reference samples to be used for prediction may be constructed using interpolation of available samples.

When the neighboring reference samples are derived, (i) a prediction sample may be derived based on average or interpolation of neighboring reference samples of the current block and (ii) the prediction sample may be derived based on a reference sample present in a specific (prediction) direction with respect to the prediction sample among the neighboring reference samples of the current block. The case of (i) may be referred to as a non-directional mode or a non-angular mode and the case of (ii) may be referred to as a directional mode or an angular mode.

In addition, the prediction sample may be generated through interpolation with a first neighboring sample located in a prediction direction of the intra prediction mode of the current block and a second neighboring sample located in the opposite direction based on a prediction target sample of the current block among the neighboring reference samples. The above-described case may be referred to as linear interpolation intra prediction (LIP).

In addition, chroma prediction samples may be generated based on luma samples using a linear model. This case may be called a linear model (LM) mode.

In addition, a temporary prediction sample of the current block may be derived based on filtered neighboring reference samples, and the prediction sample of the current block may be derived by weighted-summing the temporary prediction sample and at least one reference sample derived according to the intra prediction mode among the existing neighboring reference samples, that is, the unfiltered neighboring reference samples. This case may be referred to as position dependent intra prediction (PDPC).

In addition, a reference sample line with highest prediction accuracy may be selected from multiple neighboring reference sample lines of the current block to derive a prediction sample using a reference sample located in a prediction direction in the corresponding line, and, at this time, information (e.g., intra_luma_ref_idx) on the used reference sample line may be encoded and signaled in a bitstream. This case may be referred to as multi-reference line (MRL) intra prediction or MRL based intra prediction. When MRL is not applied, reference samples may be derived from a reference sample line directly adjacent to the current block and, in this case, information on the reference sample line may not be signaled.

In addition, the current block may be split into vertical or horizontal sub-partitions to perform intra prediction with respect to each sub-partition based on the same intra prediction mode. At this time, neighboring reference samples of intra prediction may be derived in units of sub-partitions. That is, a reconstructed sample of a previous sub-partition in encoding/decoding order may be used as a neighboring reference sample of a current sub-partition. In this case, the intra prediction mode for the current block equally applies to the sub-partitions and the neighboring reference samples are derived and used in units of sub-partitions, thereby increasing intra prediction performance. Such a prediction method may be referred to as intra sub-partitions (ISP) or ISP based intra prediction.

The intra prediction technique may be referred to as various terms such as intra prediction type or additional intra prediction mode to be distinguished from a directional or non-directional intra prediction mode. For example, the intra prediction technique (intra prediction type or the additional intra prediction mode) may include at least one of LIP, LM, PDPC, MRL or ISP. A general intra prediction method excluding a specific intra prediction type such as LIP, LM, PDPC, MRL or ISP may be referred to as a normal intra prediction type. The normal intra prediction type may be generally applied when the specific intra prediction type is not applied, and prediction may be performed based on the above-described intra prediction mode. Meanwhile, if necessary, post-filtering may be performed with respect to the derived prediction sample.

Specifically, the intra prediction procedure may include an intra prediction mode/type determination step, a neighboring reference sample derivation step and an intra prediction mode/type based prediction sample derivation step. In addition, if necessary, post-filtering may be performed with respect to the derived prediction sample.

Figure 6:
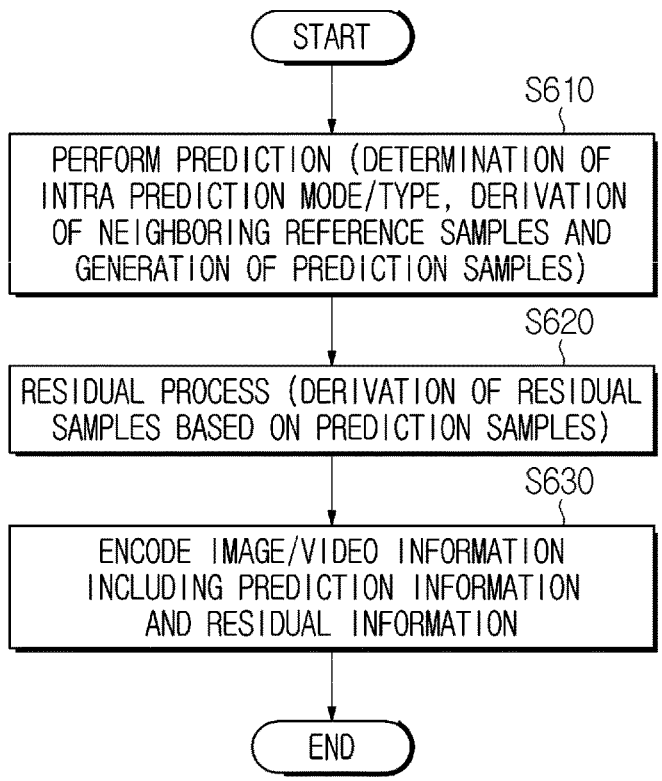
FIG. 6 is a flowchart an intra prediction based video/image encoding method.

FIG. 6 is a flowchart illustrating an intra prediction based video/image encoding method.

The encoding method of FIG. 6 may be performed by the image encoding apparatus of FIG. 2. Specifically, step S610 may be performed by the intra prediction unit 185, and step S620 may be performed by the residual processor. Specifically, step S620 may be performed by the subtractor 115. Step S630 may be performed by the entropy encoder 190. The prediction information of step S630 may be derived by the intra prediction unit 185, and the residual information of step S630 may be derived by the residual processor. The residual information is information on the residual samples. The residual information may include information on quantized transform coefficient for the residual samples. As described above, the residual samples may be derived as transform coefficient through the transformer 120 of the image encoding apparatus, and the transform coefficient may be derived as the transform coefficients quantized through the quantizer 130. The information on the quantized transform coefficients may be encoded by the entropy encoder 190 through a residual coding procedure.

The image encoding apparatus may perform intra prediction with respect to a current block (S610). The image encoding apparatus may determine an intra prediction mode/ type for the current block, derive neighboring reference samples of the current block, and generate prediction samples in the current block based on the intra prediction mode/type and the neighboring reference samples. Here, the intra prediction mode/type determination, neighboring reference samples derivation and prediction samples generation procedures may be simultaneously performed or any one procedure may be performed before the other procedures.

Figure 7:
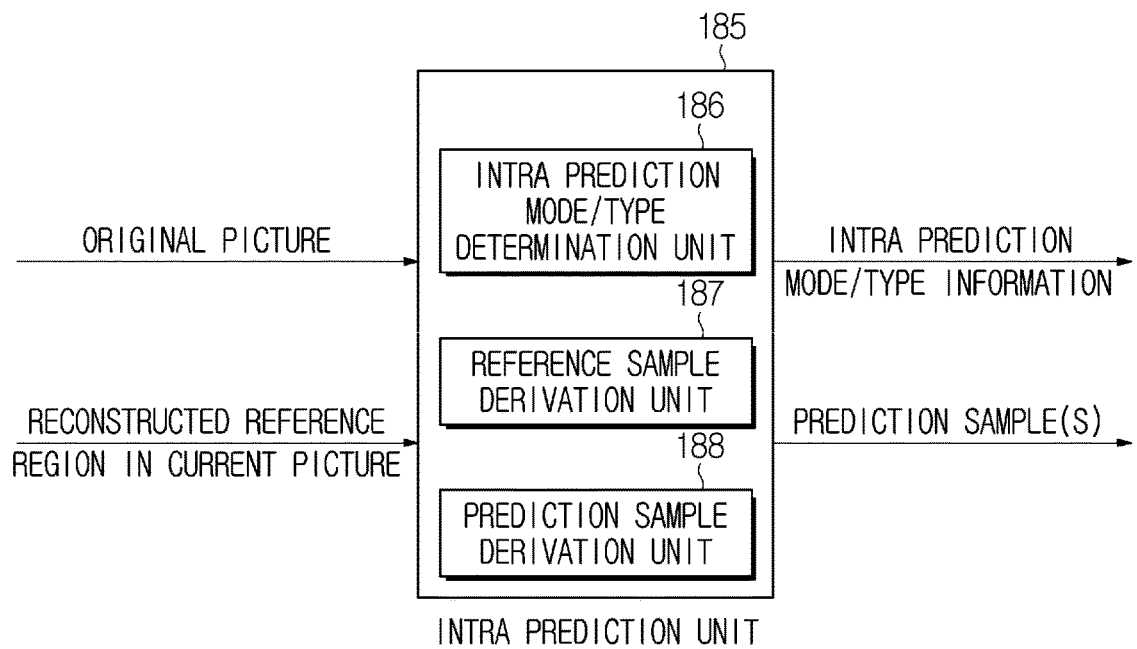
FIG. 7 is a view illustrating the configuration of an intra prediction unit 185 according to the present disclosure.

FIG. 7 is a view illustrating the configuration of an intra prediction unit 185 according to the present disclosure.

As shown in FIG. 7, the intra prediction unit 185 of the image encoding apparatus may include an intra prediction mode/type determination unit 186, a reference sample derivation unit 187 and/or a prediction sample derivation unit 188. The intra prediction mode/type determination unit 186 may determine an intra prediction mode/type for the current block. The reference sample derivation unit 187 may derive neighboring reference samples of the current block. The prediction sample derivation unit 188 may derive prediction samples of the current block. Meanwhile, although not shown, when the below-described prediction sample filtering procedure is performed, the intra prediction unit 185 may further include a prediction sample filter (not shown).

The image encoding apparatus may determine a mode/type applying to the current block among a plurality of intra prediction modes/types. The image encoding apparatus may compare rate distortion (RD) cost for the intra prediction modes/types and determine an optimal intra prediction mode/type for the current block.

Meanwhile, the image encoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

Referring to FIG. 6 again, the image encoding apparatus may generate residual samples for the current block based on the prediction samples or the filtered prediction samples (S620). The image encoding apparatus may derive the residual samples by subtracting the prediction samples from the original samples of the current block. That is, the image encoding apparatus may derive the residual sample values by subtracting the corresponding prediction sample value from the original sample value.

The image encoding apparatus may encode image information including information on the intra prediction (prediction information) and residual information of the residual samples (S630). The prediction information may include the intra prediction mode information and/or the intra prediction technique information. The image encoding apparatus may output the encoded image information in the form of a bitstream. The output bitstream may be transmitted to the image decoding apparatus through a storage medium or a network.

The residual information may include residual coding syntax, which will be described later. The image encoding apparatus may transform/quantize the residual samples and derive quantized transform coefficients. The residual information may include information on the quantized transform coefficients.

Meanwhile, as described above, the image encoding apparatus may generate a reconstructed picture (including reconstructed samples and a reconstructed block). To this end, the image encoding apparatus may perform dequantization/inverse transform with respect to the quantized transform coefficients and derive (modified) residual samples. The reason for transforming/quantizing the residual samples and then performing dequantization/inverse transform is to derive the same residual samples as residual samples derived by the image decoding apparatus. The image encoding apparatus may generate a reconstructed bock including reconstructed samples for the current block based on the prediction samples and the (modified) residual samples. Based on the reconstructed block, the reconstructed picture for the current picture may be generated. As described above, an in-loop filtering procedure is further applicable to the reconstructed picture.

Figure 8:
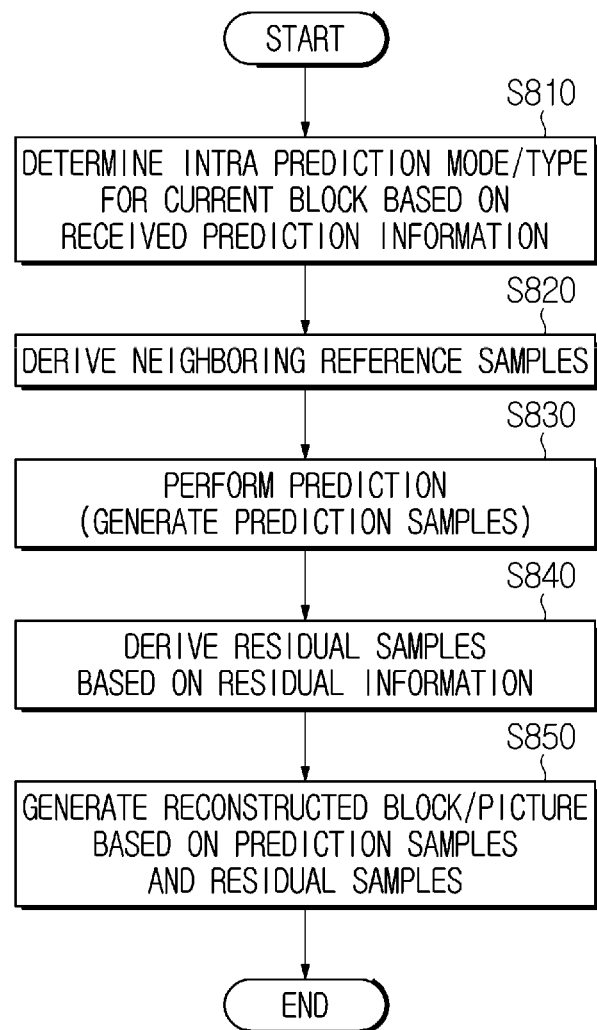
FIG. 8 is a flowchart illustrating an intra prediction based video/image decoding method.

FIG. 8 is a flowchart illustrating an intra prediction based video/image decoding method.

The image decoding apparatus may perform operation corresponding to operation performed by the image encoding apparatus.

The decoding method of FIG. 8 may be performed by the image decoding apparatus of FIG. 3. Steps S810 to S830 may be performed by the intra prediction unit 265, and the prediction information of step S810 and the residual information of step S840 may be obtained from a bitstream by the entropy decoder 210. The residual processor of the image decoding apparatus may derive residual samples for the current block based on the residual information (S840). Specifically, the dequantizer 220 of the residual processor may perform dequantization based on the dequantized transform coefficients derived based on the residual information to derive transform coefficients, and the inverse transformer 230 of the residual processor may perform inverse transform with respect to the transform coefficients to derive the residual samples for the current block. Step S850 may be performed by the adder 235 or the reconstructor.

Specifically, the image decoding apparatus may derive an intra prediction mode/type for the current block based on the received prediction information (intra prediction mode/type information) (S810). The image decoding apparatus may derive neighboring reference samples of the current block (S820). The image decoding apparatus may generate prediction samples in the current block based on the intra prediction mode/type and the neighboring reference samples (S830). In this case, the image decoding apparatus may perform a prediction sample filtering procedure. Prediction sample filtering may be referred to as post-filtering. By the prediction sample filtering procedure, some or all of the prediction samples may be filtered. In some cases, the prediction sample filtering procedure may be omitted.

The image decoding apparatus may generate residual samples for the current block based on the received residual information (S840). The image decoding apparatus may generate reconstructed samples for the current block based on the prediction samples and the residual samples and derive a reconstructed block including the reconstructed samples (S850). Based on the reconstructed block, the reconstructed picture for the current picture may be generated. An in-loop filtering procedure is further applicable to the reconstructed picture, as described above.

Figure 9:
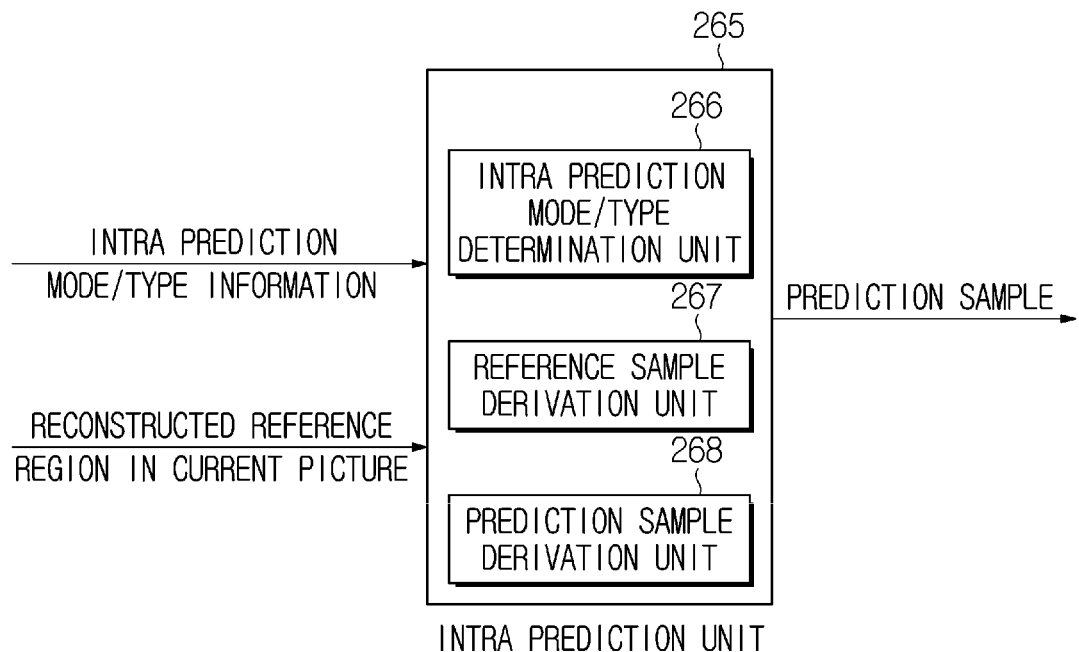
FIG. 9 is a view illustrating the configuration of an intra prediction unit 265 according to the present disclosure.

FIG. 9 is a view illustrating the configuration of an intra prediction unit 265 according to the present disclosure.

As shown in FIG. 9, the intra prediction unit 265 of the image decoding apparatus may include an intra prediction mode/type determination unit 266, a reference sample derivation unit 267 and a prediction sample derivation unit 268. The intra prediction mode/type determination unit 266 may determine an intra prediction mode/type for the current block based on the intra prediction mode/type information generated and signaled by the intra prediction mode/type determination unit 186 of the image encoding apparatus, and the reference sample derivation unit 267 may derive neighboring reference samples of the current block from a reconstructed reference region in a current picture. The prediction sample derivation unit 268 may derive prediction samples of the current block. Meanwhile, although not shown, when the above-described prediction sample filtering procedure is performed, the intra prediction unit 265 may further include a prediction sample filter (not shown).

The intra prediction mode information may include, for example, flag information (e.g., intra_luma_mpm_flag) indicating whether to apply a most probable mode (MPM) or a remaining mode to the current block, and, when the MPM applies to the current block, the intra prediction mode information may further include index information (e.g., intra_luma_mpm_idx) indicating one of the intra prediction mode candidates (MPM candidates). The intra prediction mode candidates (MPM candidates) may be composed of an MPM candidate list or an MPM list. In addition, when the MPM does not apply to the current block, the intra prediction mode information may further include remaining mode information (e.g., intra_luma_mpm_remainder) indicating one of the remaining intra prediction modes excluding the intra prediction mode candidates (MPM candidates). The image decoding apparatus may determine the intra prediction mode of the current block based on the intra prediction mode information. The MPM candidate modes may include the intra prediction modes of the neighboring blocks (e.g., the left neighboring block and the upper neighboring block) of the current block and additional candidate modes.

In addition, the intra prediction technique information may be implemented in various forms. For example, the intra prediction technique information may include intra prediction technique index information specifying one of the intra prediction techniques. As another example, the intra prediction technique information may include at least one of reference sample line information (e.g., intra_luma_ref_idx) specifying whether to apply MRL to the current block and, if applied, which reference sample line is used, ISP flag information (e.g., intra_subpartitions_mode_flag) specifying whether to apply ISP to the current block, ISP type information (e.g., intra_subpartitions_split_flag) specifying the split type of sub-partitions when applying ISP, flag information specifying whether to apply PDPC, or flag information specifying whether to apply LIP. In the present disclosure, ISP flag information may be referred to as an ISP application indicator.

The intra prediction mode information and/or the intra prediction technique information may be encoded/decoded through the coding method described in the present disclosure. For example, the intra prediction mode information and/or the intra prediction technique information may be encoded/decoded through entropy coding (e.g., CABAC, CAVLC) based on a truncated (rice) binary code.

Figure 10:
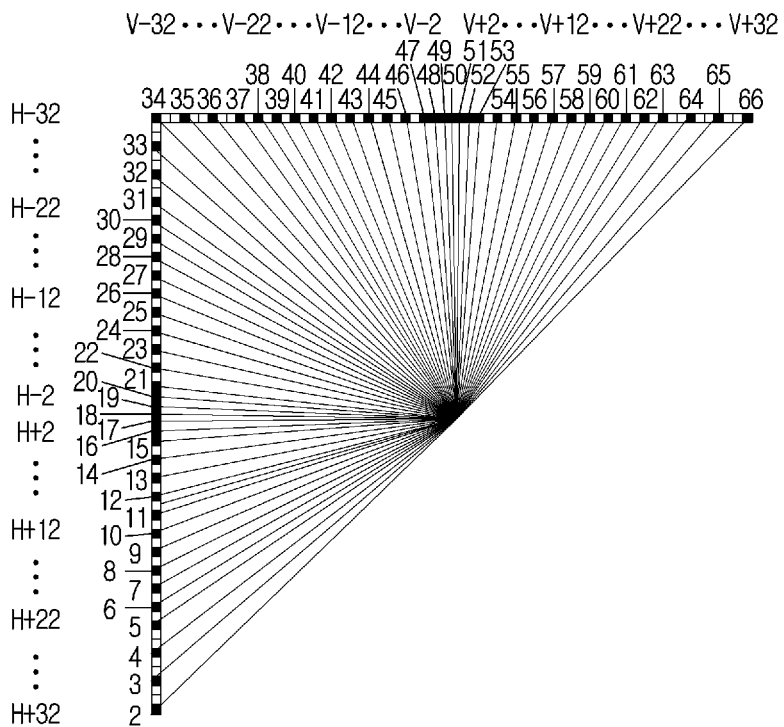
FIG. 10 is a view illustrating an intra prediction direction according to an embodiment of the present disclosure.

FIG. 10 shows an intra prediction direction according to an embodiment of the present disclosure.

The intra prediction mode may include two non-directional intra prediction modes and 33 directional intra prediction modes. The non-directional intra prediction modes may include a planar intra prediction mode and a DC intra prediction mode, and the directional intra prediction modes may include second to 34$^{th}$ intra prediction modes. The planar intra prediction mode may be referred to as a planar mode and the DC intra prediction mode may be referred to as a DC mode.

Alternatively, in order to capture any edge direction presented in natural video, as shown in FIG. 10, the intra prediction mode may include two non-directional intra prediction modes and 65 extended directional intra prediction modes. The non-directional intra prediction modes may include a planar mode and a DC mode, and the directional intra prediction modes may include second to 66$^{th}$ intra prediction modes. The extended intra prediction modes may apply to blocks having all sizes and apply to both a luma component (luma block) and a chroma component (chroma block).

Alternatively, the intra prediction mode may include two non-directional intra prediction modes and 129 directional intra prediction modes. The non-directional intra prediction modes may include a planar mode and a DC mode and the directional intra prediction modes may include second to 130$^{th}$ intra prediction modes.

Meanwhile, the intra prediction mode may further include a cross-component linear model (CCLM) mode for chroma samples in addition to the above-described intra prediction modes. The CCLM mode may be split into L_CCLM, T_CCLM, LT_CCLM according to whether left samples, upper samples or both thereof is considered for LM parameter derivation and may apply only to a chroma component.

For example, the intra prediction mode may be, for example, indexed as shown in Table 1 below

TABLE 1

| Intra prediction mode | Associated name |
|---|---|
| 0 | INTRA_PLANAR |
| 1 | INTRA_DC |
| 2 ... 66 | INTRA_ANGULAR2 ... INTRA_ANGULAR66 |
| 81 ... 83 | INTRA_LT_CCLM, INTRA_L_CCLM, INTRA_T_CCLM |

Figure 11:
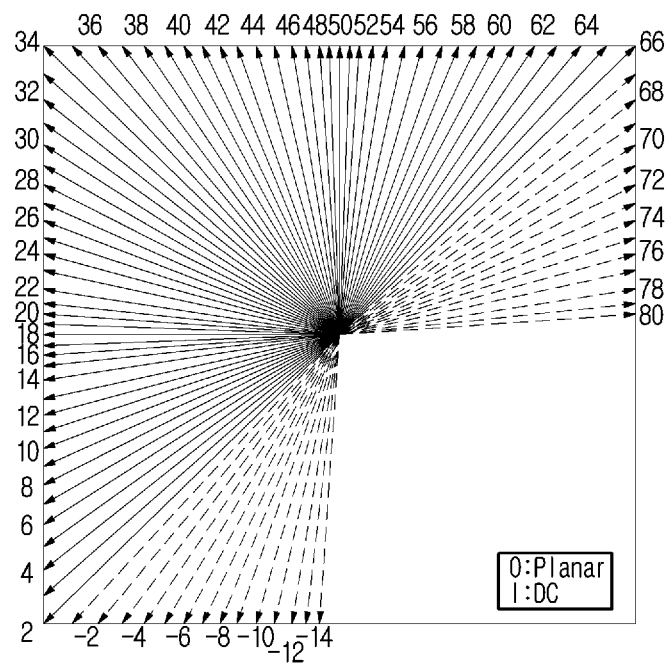
FIG. 11 is a view illustrating an intra prediction direction according to another embodiment of the present disclosure.

FIG. 11 shows an intra prediction direction according to another embodiment of the present disclosure. In FIG. 11, a dotted-line direction shows a wide angle mode applying only to a non-square block. As shown in FIG. 11, in order to capture any edge direction presented in natural video, the intra prediction mode according to an embodiment may include two non-directional intra prediction modes and 93 directional intra prediction modes. The non-directional intra prediction modes may include a planar mode and a DC mode, and the directional intra prediction modes may include second to 80$^{th}$ and $-1^{st}$ to $-14^{th}$ intra prediction modes, as denoted by arrow of FIG. 11. The planar mode may be denoted by INTRA_PLANAR, and the DC mode may be denoted by INTRA_DC. In addition, the directional intra prediction mode may be denoted by INTRA_ANGULAR-14 to INTRA_ANGULAR-1 and INTRA_ANGULAR2 to INTRA_ANGULAR80.

Overview of Block Difference Pulse Code Modulation (BDPCM)

BDPCM according to the present disclosure may be performed in a quantized residual domain. The quantized residual domain may include a quantized residual signal (or quantized residual coefficients), and, when applying BDPCM, transform for the quantized residual signal is skipped. That is, when applying BDPCM, transform for residual samples is skipped and quantization applies for the residual samples. Alternatively, the quantized residual domain may include quantized transform coefficients.

When BDPCM applies to a current block, a predicted block (prediction block) including predicted samples of the current block may be generated by intra prediction. In this case, an intra prediction mode for performing intra prediction may be signaled through a bitstream and may be derived based on a prediction direction of BDPCM described below. In addition, in this case, the intra prediction mode may be determined to be one of a vertical prediction direction mode or a horizontal prediction direction mode. For example, when the prediction direction of BDPCM is a horizontal direction, the intra prediction mode may be determined to be a horizontal prediction direction mode, and the prediction block of the current block may be generated by intra prediction of the horizontal direction. Alternatively, when the prediction direction of BDPCM is a vertical direction, the intra prediction mode may be determined to be a vertical prediction direction mode, and the prediction block of the current block may be generated by intra prediction of the vertical direction. When applying intra prediction of the horizontal direction, a value of a pixel adjacent to the left of the current block may be determined to be a prediction sample value of samples included in a corresponding row of the current block. When applying intra prediction of the vertical direction, a value of a pixel adjacent to the top of the current block may be determined to be a prediction sample value of samples included in a corresponding column of the current block. When applying BDPCM to the current block, a method of generating the prediction block of the current block may be equally performed in an image encoding apparatus and an image decoding apparatus.

When applying BDPCM to the current block, the image encoding apparatus may generate a residual block including residual samples of the current block, by subtracting the prediction sample from the current block. The image encoding apparatus may quantize the residual block and then encode a difference (or delta) between a quantized residual sample and a predictor of the quantized residual sample. The image decoding apparatus may generate the quantized residual block of the current block, by obtaining the quantized residual sample of the current block based on the predictor and the difference reconstructed from a bitstream. Thereafter, the image decoding apparatus may dequantize the quantized residual block and then add it to the prediction block, thereby reconstruct the current block.

Figure 12:
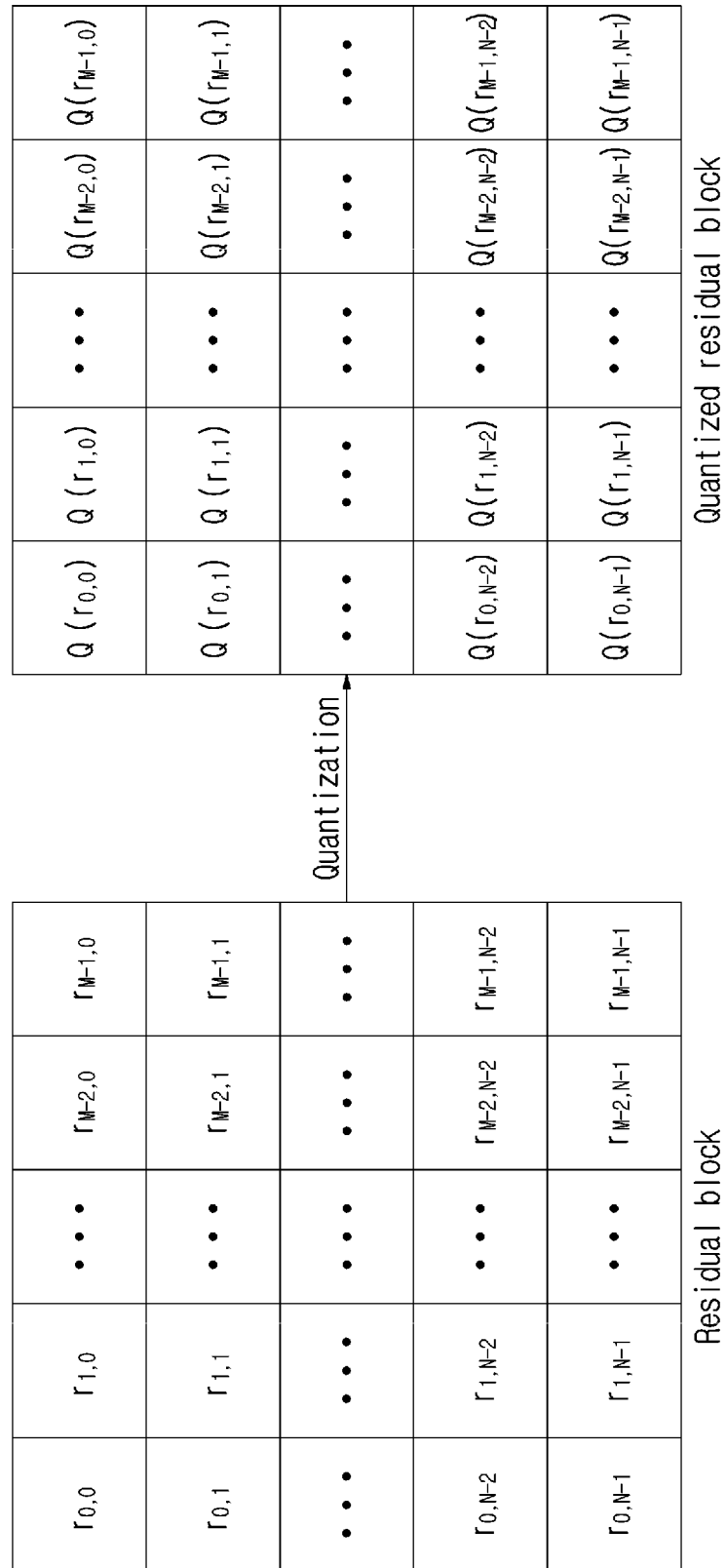
FIG. 12 is a view illustrating a method of encoding a residual sample of BDPCM according to the present disclosure.

FIG. 12 is a view illustrating a method of encoding a residual sample of BDPCM according to the present disclosure.

The residual block of FIG. 12 may be generated by subtracting a prediction block from a current block in an image encoding apparatus. The quantized residual block of FIG. 12 may be generated by quantizing the residual block. In FIG. 12, $r_{i,j}$ specifies a value of a residual sample of the (i, j) coordinates in a current block. When the size of the current block is M×N, a value i may be from 0 to M−1, inclusive. In addition, a value j may be from 0 to N−1, inclusive. For example, $r_{i,j}$ may be derived by subtracting the value of the prediction sample from the value of an original sample of the (i, j) coordinates in the current block. In FIG. 12, $Q(r_{i,j})$ specifies a value of the quantized residual sample of the (i, j) coordinates in the current block. Prediction of BDPCM may be performed with respect to the quantized residual samples of FIG. 12, thereby a modified quantized residual block having a size of M×N including modified quantized residual samples may be generated.

When the prediction direction of BDPCM is a horizontal direction, the value $r'_{i,j}$ of the modified quantized residual sample of the (i, j) coordinates in the current block may be calculated as shown in Equation 1.

$$r'_{i,j} = \begin{cases} Q(r_{i,j}), & i = 0, 0 \le j \le (N-1) \\ Q(r_{i,j}) - Q(r_{(i-1),j}), & 1 \le i \le (M-1), 0 \le j \le (N-1) \end{cases} \quad \text{Equation 1}$$

As shown in Equation 1 above, when the prediction direction of BDPCM is a horizontal direction, the value $r'_{0,j}$ of the (0, j) coordinates is assigned a value $Q(r_0,j)$ of the quantized residual sample without change. The value $r'_{i,j}$ of the other (i, j) coordinates is derived as a difference between the value $Q(r_{i,j})$ of the quantized residual sample of the (i, j) coordinates and the value $Q(r_{i-1,j})$ of the quantized residual sample of the (i−1, j) coordinates. That is, instead of encoding the value $Q(r_{i,j})$ of the quantized residual sample of the (i, j) coordinates, a difference calculated using the value $Q(r_{i-1,j})$ of the quantized residual sample of the (i−1, j) coordinates as prediction value is derived as the modified quantized residual sample value $r'_{i,j}$ and then the value $r'_{i,j}$ is encoded.

When the prediction direction of BDPCM is a vertical direction, the value $r'_{0,j}$ of the modified quantized residual sample of the (0, j) coordinates in the current block may be calculated as shown in Equation 2.

$$r'_{i,j} = \begin{cases} Q(r_{i,j}), & 0 \le i \le (M-1), j = 0 \\ Q(r_{i,j}) - Q(r_{i,(j-1)}), & 0 \le i \le (M-1), 1 \le j \le (N-1) \end{cases} \quad \text{Equation 2}$$

As shown in Equation 2 above, when the prediction direction of BDPCM is a vertical direction, the value $r'_{0,j}$ of the (i, 0) coordinates is assigned a value $Q(r_{i,0})$ of the quantized residual sample without change. The value $r'_{i,j}$ of the other (i, j) coordinates is derived as a difference between the value $Q(r_{i,j})$ of the quantized residual sample of the (i, j) coordinates and the value $Q(r_{i,j-1})$ of the quantized residual sample of the (i, j−1) coordinates. That is, instead of encoding the value $Q(r_{i,j})$ of the quantized residual sample of the (i, j) coordinates, a difference calculated using the value $Q(r_{i,j-1})$ of the quantized residual sample of the (i, j−1) coordinates as prediction value is derived as the modified quantized residual sample value and then the value $r'_{i,j}$ is encoded.

As described above, a process of modifying a current quantized residual sample value using an adjacent quantized residual sample value as a prediction value may be referred to as BDPCM prediction.

Finally, the image encoding apparatus may encode and transmit a modified quantized residual block including the modified quantized residual samples to an image decoding apparatus. In this case, as described above, transform of the modified quantized residual block is not performed.

FIG. 13 is a view illustrating a modified quantized residual block generated by performing BDPCM of the present disclosure.

In FIG. 13, horizontal BDPCM specifies a modified quantized residual block generated according to Equation 1 above, when the prediction direction of BDPCM is a horizontal direction. In addition, vertical BDPCM specifies a modified quantized residual block generated according to Equation 2 above, when the prediction direction of BDPCM is a vertical direction.

Figure 14:
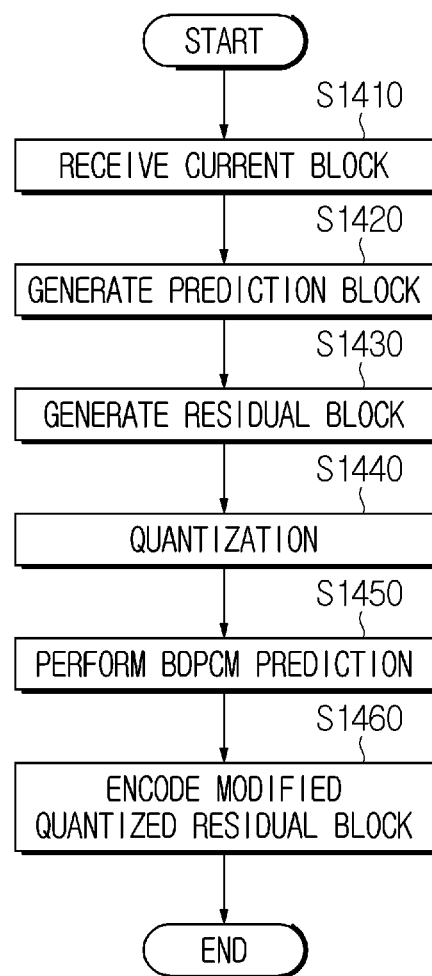
FIG. 14 is a flowchart illustrating a procedure for encoding a current block by applying BDPCM in an image encoding apparatus.

FIG. 14 is a flowchart illustrating a procedure for encoding a current block by applying BDPCM in an image encoding apparatus.

First, when a current block which is a block to be encoded is input (S1410), prediction may be performed with respect to the current block to generate a prediction block (S1420). The prediction block of step S1420 may be an intra-predicted block, and the intra prediction mode may be determined as described above. A residual block of the current block may be generated based on the prediction block generated in step S1420 (S1430). For example, the image encoding apparatus may generate a residual value (a value of a residual sample) by subtracting the prediction block (a value of a predicted sample) from the current block (a value of an original sample). For example, by performing step S1430, the residual block of FIG. 12 may be generated. Quantization may be performed with respect to the residual block generated in step S1430 (S1440), a quantized residual block may be generated, and BDPCM prediction may be performed with respect to the quantized residual block (S1450). The quantized residual block generated as a result of performing step S 1440 may be the quantized residual block of FIG. 12, and the modified quantized residual block of FIG. 13 may be generated according to the prediction direction as a result of BDPCM prediction of step S1450. BDPCM prediction of step S1450 was described with reference to FIGS. 12 to 13 and a detailed description thereof will be omitted. Thereafter, the image encoding apparatus may generate a bitstream by encoding the modified quantized residual block (S1460). In this case, transform for the modified quantized residual block may be skipped.

BDPCM operation in the image encoding apparatus described with reference to FIGS. 12 to 14 may be reversely performed in the image decoding apparatus.

Figures 15, 16:
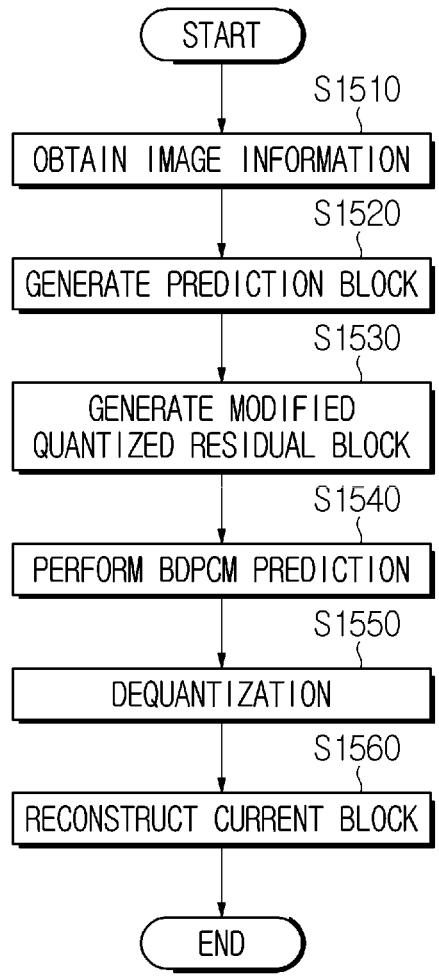
FIG. 15 is a flowchart illustrating a procedure for reconstructing a current block by applying BDPCM in an image decoding apparatus.
FIG. 16 is a view schematically illustrating information on BDPCM included in a syntax structure of a current block.

FIG. 15 is a flowchart illustrating a procedure for reconstructing a current block by applying BDPCM in an image decoding apparatus.

The image decoding apparatus may obtain information (image information) necessary to reconstruct a current block from a bitstream (S1510). The information necessary to reconstruct the current block may include information on prediction of the current block (prediction information) and information on a residual of the current block (residual information). The image decoding apparatus may perform prediction with respect to the current block based on the information on the current block and generate a prediction block (S1520). Prediction of the current block may be intra prediction and a detailed description thereof is the same as that described with reference to FIG. 14. In FIG. 15, step S1520 of generating the prediction block of the current block is shown as being performed prior to steps S1530 to S1550 of generating a residual block of the current block. However, the present disclosure is not limited thereto and the prediction block of the current block may be generated after the residual block of the current block is generated. Alternatively, the residual block of the current block and the prediction block of the current block may be simultaneously generated. The image decoding apparatus may generate the residual block of the current block by parsing the residual information of the current block from the bitstream (S1530). The residual block generated in step S1530 may be the modified quantized residual block shown in FIG. 13. The image decoding apparatus may perform BDPCM prediction with respect to the modified quantized residual block of FIG. 13 (S1540) to generate the quantized residual block of FIG. 12. BDPCM prediction of step S1540 is a procedure for generating the quantized residual block of FIG. 12 from the modified quantized residual block of FIG. 13 and thus may correspond to the reverse process of step S1450 performed by the image encoding apparatus.

BDPCM prediction of step S1540 performed by the image decoding apparatus will be described in greater detail below.

When the prediction direction of BDPCM is a horizontal direction, the image decoding apparatus may generate a quantized residual block from a modified quantized residual block using Equation 3.

$$Q(r_{i,j}) = \Sigma_{k=0}^{i} r'_{k,j}, \ 0 \le i \le (M-1), \ 0 \le j \le (N-1) \quad \text{Equation 3}$$

As defined in Equation 3, the value $Q(r_{i,j})$ of the quantized residual value of the (i, j) coordinates may be calculated by summing the values of the modified quantized residual samples from the (0, j) coordinates to the (i, j) coordinates.

Alternatively, instead of Equation 3 above, the value $Q(r_{i,j})$ of the quantized residual value of the (i, j) coordinates may be calculated using Equation 4.

$$Q(r_{i,j}) = \begin{cases} r'_{i,j}, & i = 0, 0 \le j \le (N-1) \\ r'_{i,j} + Q(r_{(i-1),j}), & 1 \le i \le (M-1), \ 0 \le j \le (N-1) \end{cases} \quad \text{Equation 4}$$

Equation 4 above is the reverse process corresponding to Equation 1. According to Equation 4 above, the value $Q(r_{0,j})$ of the quantized residual sample of the (0, j) coordinates is derived as a value $r'_{0,j}$ of the modified quantized residual sample of the (0, j) coordinates. $Q(r_{i,j})$ of the other (i, j) coordinates is derived as a sum of the value $r'_{i,j}$ of the modified quantized residual sample of the (i, j) and the value $Q(r_{i-1,j})$ of the quantized residual sample of the (i−1, j) coordinates. That is, the quantized residual sample value $Q(r_{i,j})$ may be derived by summing a difference $r'_{i,j}$ using the value $Q(r_{i-1,j})$ of the quantized residual sample of the (i−1, j) coordinates as a prediction value.

When the prediction direction of BDPCM is a vertical direction, the image decoding apparatus may generate a quantized residual block from a modified quantized residual block using Equation 5.

$$Q(r_{i,j}) = \Sigma_{k=0}^{j} r'_{i,k}, \ 0 \le i \le (M-1), \ 0 \le j \le (N-1) \quad \text{Equation 5}$$

As defined in Equation 5, the value $Q(r_{i,j})$ of the quantized residual value of the (i, j) coordinates may be calculated by summing the values of the modified quantized residual samples from the (i, 0) coordinates to the (i, j) coordinates.

Alternatively, instead of Equation 5 above, the value $Q(r_{i,j})$ of the quantized residual value of the (i, j) coordinates may be calculated using Equation 6.

$$Q(r_{i,j}) = \begin{cases} r'_{i,j}, & 0 \le i \le (M-1), \ j = 0 \\ r'_{i,j} + Q(r_{i,(j-1)}), & 0 \le i \le (M-1), 1 \le j \le (N-1) \end{cases} \quad \text{Equation 6}$$

Equation 6 above is the reverse process corresponding to Equation 2. According to Equation 6 above, the value $Q(r_{i,0})$ of the quantized residual sample of the (i, 0) coordinates is derived as a value $r'_{0,j}$ of the modified quantized residual sample of the (i, 0) coordinates. $Q(r_{i,j})$ of the other (i, j) coordinates is derived as a sum of the value $r'_{i,j}$ of the modified quantized residual sample of the (i, j) and the value $Q(r_{i,j-1})$ of the quantized residual sample of the (i, j−1) coordinates. That is, the quantized residual sample value $Q(r_{i,j})$ may be derived by summing a difference $r'_{i,j}$ using the value $Q(r_{i,j-1})$ of the quantized residual sample of the (i, j−1) coordinates as a prediction value.

When the quantized residual block composed of the quantized residual samples is generated by performing step S1540 by the above-described method, the image decoding apparatus may generate the residual block of the current block, by performing dequantization with respect to the quantized residual block (S1550). When applying BDPCM, as described above, transform for the current block is skipped and thus inverse transform of the dequantized residual block may be skipped.

Thereafter, the image decoding apparatus may reconstruct the current block based on the prediction block generated in step S1520 and the residual block generated in step S1550 (S1560). For example, the image decoding apparatus may reconstruct the current block (the value of the reconstructed block) by adding the prediction block (the value of the predicted sample) and the residual block (the value of the residual sample).

First information specifying whether BDPCM applies to the current block may be signaled through a bitstream. In addition, when BDPCM applies to the current block, second information specifying a prediction direction of BDPCM may be signaled through a bitstream. When BDPCM does not apply to the current block, the second information may not be signaled.

FIG. 16 is a view schematically illustrating information on BDPCM included in a syntax structure of a current block.

In the example shown in FIG. 16, bdpcm_flag corresponds to first information specifying whether BDPCM applies to the current block. Since BDPCM is allowed only when the current block is intra-predicted, bdpcm_flag may be signaled only when the prediction mode of the current block is MODE_INTRA. In addition, BDPCM may be available only for a luma component signal (cIdx==0), and may be available only when the size of the current block is equal to or less than a predetermined size (32×32). However, the availability condition of BDPCM is not limited to the above example, and may be available with respect to not only a luma component signal but also a chroma component signal. In addition, information specifying availability of BDPCM may be explicitly signaled at a higher level (sequence level, picture level, slice level, etc.) of the current block.

Only when bdpcm_flag specifies that BDPCM applies the current block, second information (e.g., bdpcm_dir_flag) specifying the prediction direction of BDPCM may be signaled. When the second information has a first value (e.g., 0), the prediction direction of BDPCM may specify a horizontal direction and, when the second information has a second value (e.g., 1), the prediction direction of BDPCM may specify a vertical direction.

In signal processing, transform coding means transforming an input signal into a signal in another domain. Specifically, transform in a video compression field means change from a signal in a spatial domain to a signal in a frequency domain. The reason why transform is performed in the video compression field is because efficient compression is possible using the property that, when the signal in the spatial domain is changed to the signal in the frequency domain, information is concentrated in a low frequency domain and a high frequency domain has little information. However, compression efficiency when transform is not performed may be higher according to the characteristics of the signal and, in this case, transform may be skipped.

As described above, BDPCM is applicable in a process of encoding a residual block, whose transform is skipped. When transform is skipped, as described above, residual information may be evenly distributed in the block. In addition, a probability that any residual coefficient value in the block is similar to residual coefficient values in the vicinity thereof is very high. In addition, in the case of an intra-predicted transform skip block, a probability that the level of a residual coefficient generated on the bottom right of the block is higher than that of a residual coefficient generated on the top left of the block due to a distance from a reference sample is high. This phenomenon may be more remarkable as the size of the block increases. BDPCM uses the distribution characteristics of the residual coefficient of the intra skip-coded block as described above. When applying BDPCM, as described above, instead of encoding the (quantized) residual coefficient, a difference generated by performing prediction between residual coefficients on a line-by-line basis in a row or column direction, the magnitude of the level of the residual coefficient to be encoded is reduced. That is, when applying BDPCM, since the reduced level of the coefficient is encoded as described above, it is possible to reduce generation of a context coded bin necessary for coding, which contributes to improvement of throughput of a decoder.

Meanwhile, as described above, when BDPCM is performed in the quantized residual domain, BDPCM may not be performed in case there is no residual signal. However, according to the syntax structure of the coding unit described with reference to FIG. 16, even in case there is no residual signal, there is a problem that BDPCM-related information is signaled.

Figure 17:
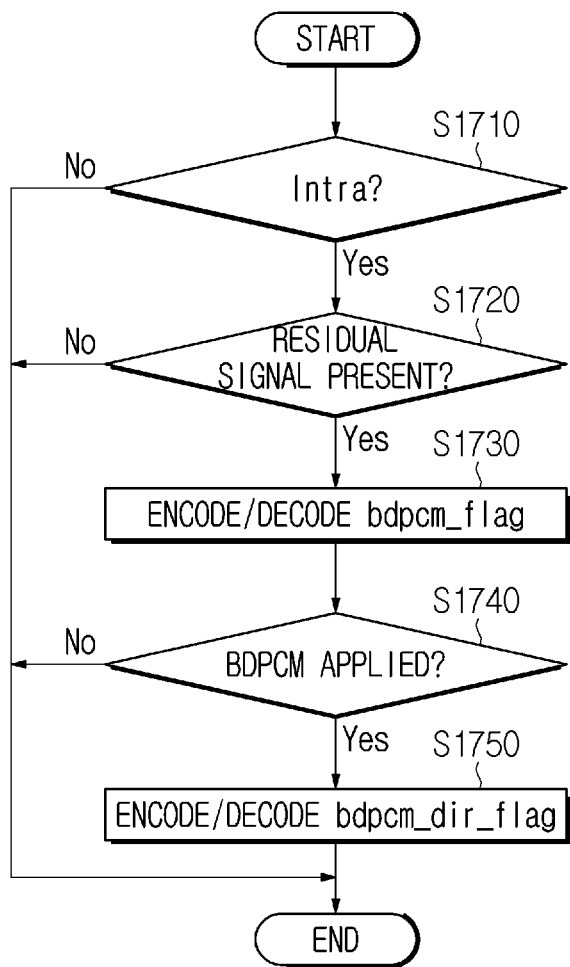
FIG. 17 is a flowchart illustrating a encoding/decoding method of BDPCM-related information according to an embodiment of the present disclosure.

FIG. 17 is a flowchart illustrating a encoding/decoding method of BDPCM-related information according to an embodiment of the present disclosure.

According to the embodiment shown in FIG. 17, BDPCM-related information may be encoded/decoded only when a residual signal is present in a current block. Information (e.g., coded block flag (cbf)) specifying whether a residual signal is present for a current block may be signaled through a bitstream, and the BDPCM-related information may be encoded/decoded based on the information.

Referring to FIG. 17, first, it may be determined whether the current block is an intra-predicted block (S1710). When the current block is not intra-predicted, BDPCM may not apply for the current block. Accordingly, the BDPCM-related information of the current block may not be encoded/decoded.

When the current block is intra-predicted, it may be determined whether a residual signal is present in the current block (S1720). Determination of step S1720 may be made, for example, based on cbf information. For example, step S1720 may be performed by checking cbf information tu_cbf_luma of a transform unit which is a unit for transmitting the residual signal of the current block. When tu_cbf_luma is 1, this means that a non-zero residual coefficient is present with respect to the luma component of the current transform unit and, when tu_cbf_luma is 0, this means that a non-zero residual coefficient is not present with respect to the luma component of the current transform unit. In step S1720, upon determining that the residual signal is not present in the current block, BDPCM-related information of the current block may not be encoded/decoded.

In step S1720, upon determining that the residual signal is present in the current block, information (e.g., bdpcm_flag) specifying whether BDPCM applies to the current block may be encoded/decoded (S1730). The image encoding apparatus may determine the value of bdpcm_flag based on whether BDPCP applies to the current block. The image decoding apparatus may parse bdpcm_flag and then determine whether BDPCM applies to the current block based on the value thereof.

Thereafter, it may be determined whether BDPCM applies to the current block (S1740). For example, determination of step S1740 may be made based on the value of bdpcm_flag. In step S1740, upon determining that BDPCM does not apply to the current block, information on the prediction information of BDPCM for the current block may not be encoded/decoded.

Upon determining that BDPCM applies to the current block in step S1740, information (e.g., bdpcm_dir_flag) on the prediction direction of BDPCM may be encoded/decoded (S1750). The image encoding apparatus may determine and encode the value of bdpcm_dir_flag based on the prediction direction applying to the current block. The image decoding apparatus may parse bdpcm_dir_flag and then determine the prediction direction of BDPCM based on the value thereof.

According to the embodiment shown in FIG. 17, it is possible to improve encoding efficiency by encoding/decoding BDPCM-related information only when the quantized residual signal is present in the intra-predicted current block In the embodiment shown in FIG. 17, as the encoding/decoding conditions of the BDPCM-related information, it is determined whether intra prediction is performed or whether the residual signal is present. However, the present disclosure is not limited thereto and, as the encoding/decoding conditions of the BDPCM-related information, the above-described various conditions (color component, the size of the block, information signaled at a higher level, etc.) regarding whether BDPCM is available may be determined.

The embodiment shown in FIG. 17 applies to the luma component but is not limited thereto and BDPCM of the present disclosure is applicable to the chroma component. That is, the embodiment described with reference to FIG. 17 is applicable to each of the chroma components Cb and Cr.

Alternatively, when BDPCM of the present disclosure applies to RGB images, the embodiment described with reference to FIG. 17 is applicable to each of R, G and B components.

Alternatively, when BDPCM of the present disclosure applies to YCoCg images, the embodiment described with reference to FIG. 17 is applicable to each of Y, Co and Cg components.

Figure 18:
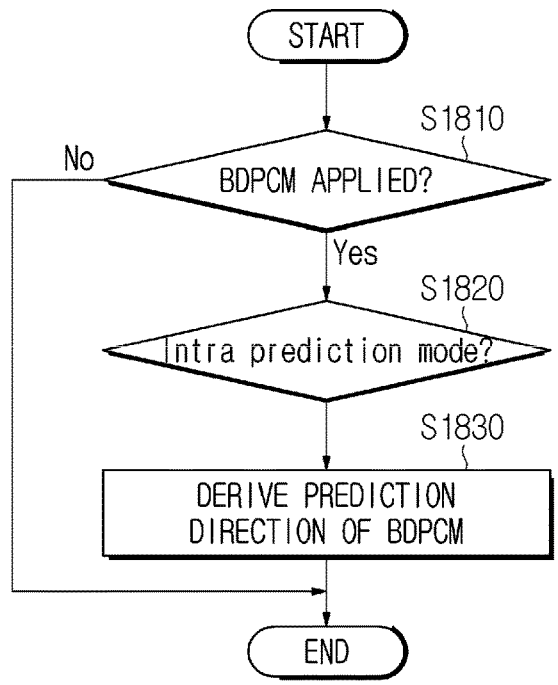
FIG. 18 is a flowchart illustrating a method of deriving a prediction direction of BDPCM based on an intra prediction direction of a current block according to another embodiment of the present disclosure.

FIG. 18 is a flowchart illustrating a method of deriving a prediction direction of BDPCM based on an intra prediction direction of a current block according to another embodiment of the present disclosure. Steps S1810 to S1830 of FIG. 18 may replace steps S1740 to S1750 of FIG. 17.

According to the embodiment described with reference to FIG. 18, since an intra prediction mode of a current block is already available, information on a prediction direction of BDPCM may not be separately signaled and the prediction direction of BDPCM may be derived from the intra prediction mode of the current block.

Specifically, it may be determined whether BDPCM applies to the current block (S1810), and, when BDPCM does not apply, a process of deriving the prediction direction of BDPCM may not be performed.

Upon determining that BDPCM applies to the current block in step S1810, the intra prediction mode of the current block is determined (S1820), and the prediction direction of BDPCM may be derived based on the intra prediction mode of the current block (S1830).

For example, when the intra prediction mode of the current block is a vertical direction mode, the prediction direction of BDPCM may be derived as a vertical direction. In contrast, when the intra prediction mode of the current block is a horizontal direction mode, the prediction direction of BDPCM may be derived as a horizontal direction. When the intra prediction mode of the current block is a non-directional mode, the prediction direction of BDPCM may be derived as a direction predetermined between the image encoding apparatus and the image decoding apparatus between the horizontal direction and the vertical direction. Alternatively, when the intra prediction mode of the current block is a non-directional mode, the prediction direction of BDPCM may be determined based on information signaled at a higher level (sequence level, picture level, slice level, etc.) of the block. Alternatively, in the example described with reference to FIG. 10, when the intra prediction mode of the current block is a mode having an absolute angle less than a $34^{th}$ mode, the prediction direction of BDPCM may be defined as a horizontal direction, and, otherwise, the prediction direction of BDPCM may be defined as a vertical direction. Alternatively, when the intra prediction mode of the current block is a mode having an absolute angle equal to or less than the $34^{th}$ mode, the prediction direction of BDPCM may be defined as a horizontal direction, and, otherwise, the prediction direction of BDPCM may be defined as a vertical direction.

As another example, when the intra prediction mode of the current block is a vertical direction mode, the prediction direction of BDPCM may be derived as a horizontal direction. In contrast, when the intra prediction mode of the current block is a horizontal direction mode, the prediction direction of BDPCM may be derived as a vertical direction. When the intra prediction mode of the current block is a non-directional mode, the prediction direction of BDPCM may be derived as a direction predetermined between the image encoding apparatus and the image decoding apparatus between the horizontal direction and the vertical direction. Alternatively, when the intra prediction mode of the current block is a non-directional mode, the prediction direction of BDPCM may be determined based on information signaled at a higher level (sequence level, picture level, slice level, etc.) of the block. Alternatively, in the example described with reference to FIG. 10, when the intra prediction mode of the current block is a mode having an absolute angle less than a $34^{th}$ mode, the prediction direction of BDPCM may be defined as a vertical direction, and, otherwise, the prediction direction of BDPCM may be defined as a horizontal direction. Alternatively, when the intra prediction mode of the current block is a mode having an absolute angle equal to or less than the $34^{th}$ mode, the prediction direction of BDPCM may be defined as a vertical direction, and, otherwise, the prediction direction of BDPCM may be defined as a horizontal direction.

When BDPCM applies to the current block, the image encoding apparatus may derive the prediction direction of BDPCM based on the intra prediction mode to perform BDPCM prediction, and may not encode information on the prediction direction of BDPCM.

According to the embodiment shown in FIG. 18, the prediction direction of BDPCM may be derived using an already available intra prediction mode. Accordingly, since there is no need to signal the information on the prediction direction of BDPCM, the amount of transmitted information may be reduced.

As a modification of the embodiment shown in FIG. 18, the information on the prediction direction of BDPCM may be signaled and the intra prediction mode of the current block may be derived based on the prediction direction of BDPCM.

Figure 19:
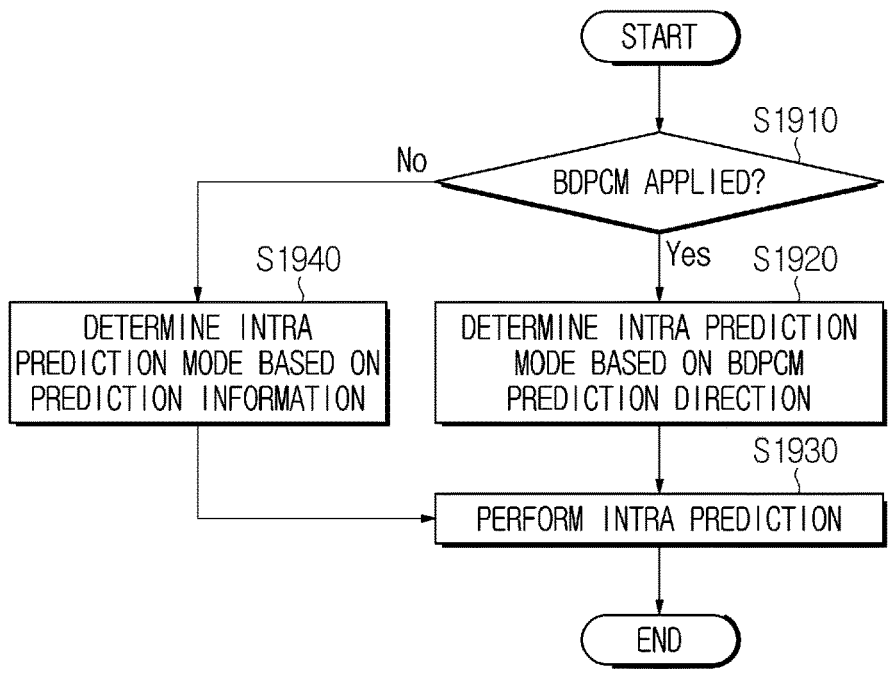
FIG. 19 is a flowchart illustrating a method of deriving an intra prediction mode of a current block based on a prediction direction of BDPCM according to another embodiment of the present disclosure.

FIG. 19 is a flowchart illustrating a method of deriving an intra prediction mode of a current block based on a prediction direction of BDPCM according to another embodiment of the present disclosure.

According to the embodiment described with reference to FIG. 19, since the prediction direction of BDPCM of the current block is already available, the information on the intra prediction mode may not be separately signaled and the intra prediction mode of the current block may be derived from the prediction direction of BDPCM of the current block.

Specifically, it may be determined whether BDPCM applies to the current block (S1910), and, when BDPCM does not apply, the intra prediction mode of the current block may be determined based on prediction information of the current block (e.g., information on the intra prediction mode) signaled through a bitstream (S1940). Thereafter, intra prediction may be performed based on the determined intra prediction mode (S1930).

Upon determining that BDPCM applies to the current block in step S1910, the intra prediction mode of the current block may be determined based on the prediction direction of BDPCM of the current block (S1920). For example, the image encoding apparatus may determine the intra prediction mode of the current block based on the prediction direction of BDPCM applying to the current block. In addition, the image decoding apparatus may decode information on the prediction direction of BDPCM (bdpcm_dir_flag) to determine the prediction direction of BDPCM of the current block, and determine the intra prediction mode of the current block based on the determined prediction direction of BDPCM. Thereafter, intra prediction may be performed based on the determined intra prediction mode (S1930).

According to an example, when the prediction direction of BDPCM is a vertical direction, the intra prediction mode may be determined to be a vertical direction mode, and, when the prediction direction of BDPCM is a horizontal direction, the intra prediction mode may be determined to be a horizontal direction mode.

According to another example, when the prediction direction of BDPCM is a vertical direction, the intra prediction mode may be determined to be a horizontal direction mode, and, when the prediction direction of BDPCM is a horizontal direction, the intra prediction mode may be determined to be a vertical direction mode.

However, a method of determining the intra prediction mode based on the prediction direction of BDPCM is not limited to the above examples.

Figure 20:
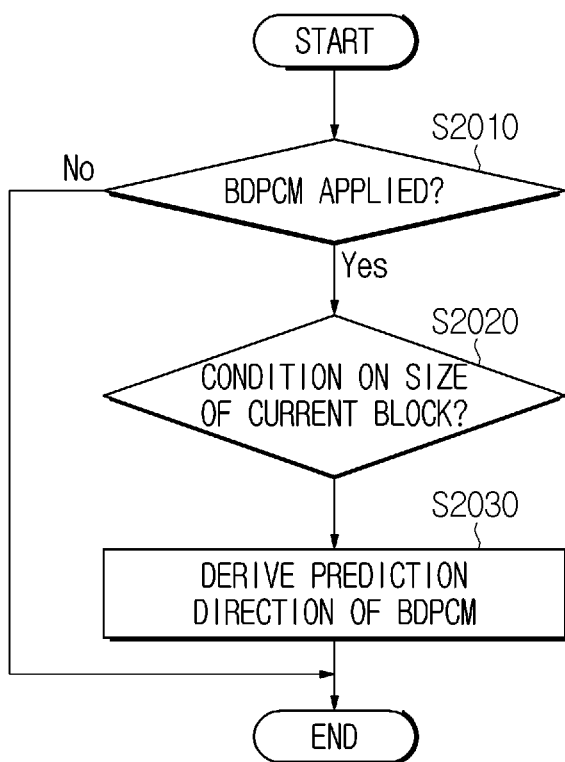
FIG. 20 is a flowchart illustrating a method of deriving a prediction direction of BDPCM based on a size of a current block according to another embodiment of the present disclosure.

FIG. 20 is a flowchart illustrating a method of deriving a prediction direction of BDPCM based on a size of a current block according to another embodiment of the present disclosure. Steps S2010 to S2030 of FIG. 20 may replace steps S1740 to S1750.

Intra prediction is characterized in that, as a distance from a reference sample increases, the level (absolute value) of a residual coefficient may increase. In consideration of this characteristic, in the embodiment described with reference to FIG. 20, the prediction direction of BDPCM of the current block may be determined based on the condition for the size of the block (comparison between the width and the height, a ratio of the width and height, etc.). In this case, the intra prediction mode of the current block may not be considered.

Specifically, it may be determined whether BDPCM applies to the current block (S2010), and, when BDPCM does not apply, a process of deriving the prediction direction of BDPCM may not be performed.

In step S2010, upon determining that BDPCM applies to the current block, a condition for the size of the current block may be determined (S2020), and the prediction direction of BDPCM may be derived based on a result of determination (S2030).

For example, when the width of the current block is greater than the height, the prediction direction of BDPCM may be derived as a horizontal direction. In contrast, when the height of the current block is greater than the width, the prediction direction of BDPCM may be derived as a vertical direction. In case the width and height of the current block are the same, the method of the embodiment described with reference to FIG. 18 is applicable. Alternatively, when the width and height of the current block are the same, the prediction direction of BDPCM may be derived as a direction predetermined between the image encoding apparatus and the image decoding apparatus between the horizontal direction and the vertical direction or determined based on information signaled at a higher level (sequence level, picture level, slice level, etc.) of the block.

As another example, when the width of the current block is greater than the height, the prediction direction of BDPCM may be derived as a vertical direction. In contrast, when the height of the current block is greater than the width, the prediction direction of BDPCM may be derived as a horizontal direction. In case the width and height of the current block are the same, the method of the embodiment described with reference to FIG. 18 is applicable. Alternatively, when the width and height of the current block are the same, the prediction direction of BDPCM may be derived as a direction predetermined between the image encoding apparatus and the image decoding apparatus between the horizontal direction and the vertical direction or determined based on information signaled at a higher level (sequence level, picture level, slice level, etc.) of the block.

As another example, when a ratio of the width to height of the current block (width/height) is equal to or greater than N, the prediction direction of BDPCM may be derived as a vertical direction. In addition, when the ratio of the width to height of the current block (width/height) is equal to or less than 1/N, the prediction direction of BDPCM may be derived as a horizontal direction. When the ratio of the width to height of the current block (width/height) is less than N and is equal to or greater than 1/N, the method of the embodiment described with reference to FIG. 18 is applicable. Alternatively, when the ratio of the width to height of the current block (width/height) is less than N and is equal to or greater than 1/N, the prediction direction of BDPCM may be derived as a direction predetermined between the image encoding apparatus and the image decoding apparatus between the horizontal direction and the vertical direction or determined based on information signaled at a higher level (sequence level, picture level, slice level, etc.) of the block. In this case, N may be an integer of 1 or more.

As another example, when a ratio of the width to height of the current block (width/height) is equal to or greater than N, the prediction direction of BDPCM may be derived as a horizontal direction. In addition, when the ratio of the width to height of the current block (width/height) is equal to or less than 1/N, the prediction direction of BDPCM may be derived as a vertical direction. When the ratio of the width to height of the current block (width/height) is less than N and is equal to or greater than 1/N, the method of the embodiment described with reference to FIG. 18 is applicable. Alternatively, when the ratio of the width to height of the current block (width/height) is less than N and is equal to or greater than 1/N, the prediction direction of BDPCM may be derived as a direction predetermined between the image encoding apparatus and the image decoding apparatus between the horizontal direction and the vertical direction or determined based on information signaled at a higher level (sequence level, picture level, slice level, etc.) of the block. In this case, N may be an integer of 1 or more.

According to the embodiment shown in FIG. 20, the prediction direction of BDPCM may be derived based on the condition for the size of the current block. Accordingly, since the information on the prediction direction of BDPCM does not need to be signaled, the amount of transmitted information may be reduced.

Overview of CABAC (Context-Based Adaptive Binary Arithmetic Coding) and Residual Signal Coding/Decoding The image encoding/decoding apparatus may encode/decode image information using CABAC. Some or all of the image information may be entropy-encoded by the entropy encoder 190 of FIG. 2 and some or all of the image information may be entropy-decoded by the entropy decoder 210. Syntax elements included in the residual signal described below may be entropy-encoded/decoded based on CABAC.

Figure 21:
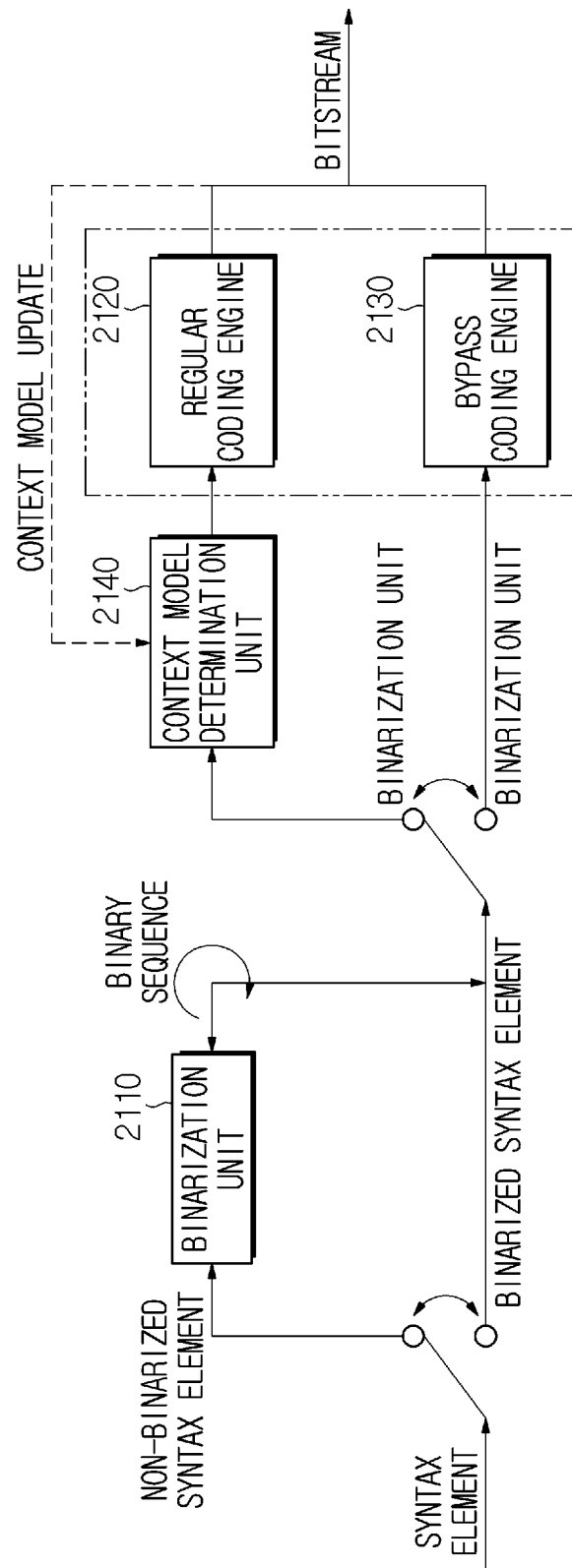
FIG. 21 is a view illustrating a CABAC entropy encoding method.

FIG. 21 is a view illustrating a CABAC entropy encoding method.

When an input signal is a syntax element having a non-binary value, the input signal may be converted into a binary value through a binarization unit 2110. When the input image already has a binary value, the binarization process may not be performed. In this case, each binary number 0 or 1 constituting the binary value may be referred to as a bin. For example, when a binary sequence after binarization is 110, each of 1, 1 and 0 may be one bine. Binary or binary sequence for one syntax element may represent a value of the corresponding syntax element.

Binarized bins may be input to a regular coding engine 2120 or a bypass coding engine 2130. A context model determination unit 2140 may assign a context model reflecting a probability value for a corresponding bin, and the regular coding engine 2120 may code the corresponding bin based on the assigned context model. After each bin is coded in the regular coding engine 2120, the probability model for the corresponding bin may be updated. The encoded bins may be context-coded bins. In the bypass coding engine 2130, a procedure for estimating a probability with respect to the input bin and a procedure for updating the probability model which has applied to the corresponding bin may be omitted. The bypass coding engine 2130 may code the input bin by applying a uniform probability distribution instead of assigning a context, thereby improving a coding rate. The bins coded through the bypass coding engine 2130 may be referred to as bypass bins.

The entropy encoder 190 may determine whether to perform coding through the regular coding engine 2120 or whether to perform coding through the bypass coding engine 2130 and switch a coding path.

Meanwhile, entropy coding may be performed in the reverse order of the coding process of FIG. 21. The entropy decoder 210 may decode a bitstream into a binary sequence using one of a regular coding decoding engine or a bypass decoding engine. After decoding is performed in the regular coding engine, the probability model for the corresponding bin may be updated. Meanwhile, in the bypass decoding engine, a procedure for estimating a probability with respect to the input bin and a procedure for updating the probability model may be omitted. The bin generated through one of the regular coding decoding engine or the bypass decoding engine may be finally reconstructed to a syntax element which is a first input signal through selective inverse binarization of an inverse binarization unit.

Residual samples may be derived using transform coefficients quantized through a transform and quantization process. The quantized transform coefficients may be defined as transform coefficients. Transform coefficients in the block may be signaled in the form of residual information. Residual information may include a residual coding syntax element. The image encoding apparatus may construct a residual coding syntax element with the residual information and encode and output it in the form of a bitstream. In contrast, the image decoding apparatus may obtain the quantized transform coefficients by decoding the residual coding syntax element from the bitstream. Hereinafter, the residual coding syntax element may be referred to as a syntax element.

For example, the transform coefficient may be coded/decoded using at least one residual coding syntax element of last_sig_coeff_x_prefix, last_sig_coeff_y_prefix, last_sig_coeff_x_suffix, last_sig_coeff_y_suffix, coded_sub_block_flag, sig_coeff_flag, abs_level_gtX_flag, par_level_flag, abs_remainder or dec_abs_level, coeff_sign_flag. A process of coding/decoding the transform coefficient using the syntax element may be defined as residual (data) coding or (transform) coefficient coding. In this case, the transform/quantization process may be omitted. Hereinafter, each of the above-described syntaxes will be described in detail. The names of the syntax elements described below are examples and the scope of the present disclosure is not limited by the names of the syntax elements.

The syntax elements last_sig_coeff_x_prefix, last_sig_coeff_y_prefix, last_sig_coeff_x_suffix and last_sig_coeff_y_suffix are syntax elements for coding (x, y) position information of a final non-zero coefficient in an associated block. In this case, the associated block may be a coding block (CB) or a transform block (TB). Hereinafter, a block in the transform, quantization and residual coding process may be a coding block or a transform block.

Specifically, last_sig_coeff_x_prefix may specify a prefix of a column position of a last significant coefficient in the scan order in the transform block, and last_sig_coeff_y_prefix may specify a prefix of a row position of the last significant coefficient in the scan order in the transform block. last_sig_coeff_x_suffix may specify a suffix of a column position of a last significant coefficient in the scan order in the transform block, and last_sig_coeff_y_suffix may specify a suffix of a row position of the last significant coefficient in the scan order in the transform block. The significant coefficient may mean a non-zero coefficient. The scan order may be one of a top-right diagonal scan order, a horizontal scan order and a vertical scan order. In this case, the horizontal scan order may mean the scan order from the left to the right, and the vertical scan order may mean the scan order from the top to the bottom. The scan order may be determined based on whether intra/inter prediction applies to a target block and/or a detailed intra/inter prediction mode.

The syntax element coded_sub_block_flag may specify whether each subblock includes a non-zero coefficient when the current block is partitioned into subblocks having four or 16 pixels (e.g., 1×16, 2×8, 8×2, 16×1, 4×4 or 2×2 subblocks). In this case, the subblock may be represented by a coefficient group (CG).

For example, when the value of coded_sub_block_flag is 0, since there is no more information to be transmitted, the coding process of the subblock may end. In contrast, when the value of coded_sub_block_flag is 1, a process of coding/decoding sig_coeff_flag may be performed. According to the scan order, signaling of coded_sub_block_flag may not be performed with respect to a subblock including a last non-zero coefficient. This may be because, in a top left subblock, since there is a DC coefficient, a probability that there is a non-zero coefficient is high. Accordingly, coded_sub_block_flag may not be coded with respect to a subblock including a last non-zero coefficient and the value thereof may be set to 1.

When coded_sub_block_flag specifies that there is a non-zero coefficient in a current subblock, sig_coeff_flag having a binary value may be coded/decoded in the reversely scanned order. A 1-bit syntax element sig_coeff_flag[n] may be coded/decoded with respect to the coefficient at the corresponding scan position n according to the scan order. A syntax element sig_coeff_flag[n] may specify whether the coefficient at the current scan position has a value of 0. In the case of a subblock including a last non-zero coefficient, sig_coeff_flag[n] does not need to be coded/decoded with respect to the last non-zero coefficient and thus a coding/decoding process may be skipped.

Only when sig_coeff_flag[n] is 1, level information coding/decoding may be performed. In this case, the level information coding/decoding process may be performed using at least one of the above-described syntax elements. Meanwhile, the syntax element sig_coeff_flag[xC][yC] may specify whether the transform coefficient at each transform coefficient position (xC, yC) in the current block is 0.

The remaining level value after coding/decoding sig_coeff_flag[n] may be derived according to Equation 7 below.

$$\text{remAbsLevel}[n]=|\text{coeff}[n]|-1 \qquad \text{Equation 7}$$

In this case, a syntax element remAbsLevel[n] may specify a level value to be coded/encoded at a scan position n. coeff[n] may mean an actual transform coefficient value.

A syntax element abs_level_gtx_flag[n][0] may specify whether |coeff[n]| at the scan position n is greater than 1. When the value of abs_level_gtX_flag[n][0] is 0, the absolute value of the coefficient at the corresponding position may be 1. In contrast, when the value of abs_level_gtX_flag[n][0] is 1, remAbsLevel[n] may be derived according to Equation 8 below.

$$\text{remAbsLevel}[n]=\text{remAbsLevel}[n]-1 \qquad \text{Equation 8}$$

A syntax element par_level_flag[n] may be used to code/decode a least significant coefficient (LSB) value of remAbsLevel[n] according to Equation 9 below. That is, par_level_flag[n] may specify a parity of a transform coefficient level value at the scan position n. After coding/decoding par_leve_flag[n], remAbsLevel[n] may be updated according to Equation 9 below.

$$\text{par\_level\_flag}[n]=\text{remAbsLevel}[n] \& 1$$

$$\text{remAbsLevel}[n]=\text{remAbsLevel}[n]>>1 \qquad \text{Equation 9}$$

A syntax element abs_level_gtx_flag[n][1] may specify whether |coeff[n]| at the scan position n is greater than 3. For example, only when abs_level_gtX_flag[n][1] is 1, abs_remainder[n] may be coded/decoded. For example, a relationship between coeff[n] and each syntax element may be expressed as shown in Equation 10 below. In this case, |coeff[n]| may specify a transform coefficient level value and may be expressed as AbsLevel[n] for the transform coefficient. A syntax element coeff_sign_flag[n] may specify the sign of the transform coefficient at the corresponding scan position n. In summary, abs_level_gtx_flag[n][i] may be a syntax element specifying whether the absolute value of the transform coefficient is greater than any one of 1 or 3.

$$|\text{coeff}[n]|=\text{sig\_coeff\_flag}[n]+\text{abs\_level\_}gtX\text{\_flag}[n]$$
$$[0]+\text{par\_level\_flag}[n]+2*(\text{abs\_level\_}gtx\text{\_flag}[n]$$
$$[1]+\text{abs\_remainder}[n]) \qquad \text{Equation 10}$$

In consideration of the above description, the syntax elements may have the values of Table 2 according to the value of |coeff[n]|.

TABLE 2

| \|coeff[n]\| | sig_coeff_flag[n] | abs_level_gtX_flag[n][0] | par_level_flag[n] | abs_level_gtX_flag[n][1] | abs_remainder[n] |
|---|---|---|---|---|---|
| 0 | 0 | | | | |
| 1 | 1 | 0 | | | |
| 2 | 1 | 1 | 0 | 0 | |
| 3 | 1 | 1 | 1 | 0 | |
| 4 | 1 | 1 | 0 | 1 | 0 |
| 5 | 1 | 1 | 1 | 1 | 0 |
| 6 | 1 | 1 | 0 | 1 | 1 |
| 7 | 1 | 1 | 1 | 1 | 1 |
| 8 | 1 | 1 | 0 | 1 | 2 |
| 9 | 1 | 1 | 1 | 1 | 2 |
| 10 | 1 | 1 | 0 | 1 | 3 |
| 11 | 1 | 1 | 1 | 1 | 3 |
| ... | ... | ... | ... | ... | |

Meanwhile, CABAC provides high performance, but has a disadvantage that throughput performance is not good. This may be due to the regular coding engine of CABAC. The regular coding engine uses a probability state and range updated through coding of a previous bin and thus has high data dependency and has a problem that it takes considerable time to read a probability section and to determine a current state. In this case, when the number of context-coded bins is limited, the CABAC throughput problem may be solved.

For example, a sum of bins used to express sig_coeff_flag[n], abs_level_gtX_flag[n][0], par_level_flag[n] and abs_level_gtx_flag[n][1] may be limited according to the size of the subblock. For example, the sum of the bins may be limited to 32 in the case of a 4×4 subblock and may be limited to 8 in the case of a 2×2 subblock. When all a limited number of context-coded bins are used to code a context element, CABAC does not apply to the remaining coefficients and bypass coding/decoding may be performed. That is, when the number of coded/decoded bins is 32 in in a 4×4 CG and is 2 in a 2×2 CG, sig_coeff_flag[n], abs_level_gtX_flag[n][0], par_level_flag[n] and abs_level_gtx_flag[n][1] may not be additionally coded. In this case, |coeff[n]| may be coded/decoded into a preset dec_abs_level[n]. Alternatively, a sum of bins used to express sig_coeff_flag[n], abs_level_gtX_flag[n][0], par_level_flag[n] and/or abs_level_gtx_flag[n][1] may be limited according to the size of the transform block. For example, the sum of the bins may be 1.75 times the number of pixels in the block. When all a limited number of context-coded bins are used to code the context element, CABAC does not apply to the remaining coefficient and bypass coding/decoding may be performed. That is, when the sum of the coded/decoded bins exceeds 1.75 times the number of pixels in the block (e.g., 448 in the case of a 16×16 block), sig_coeff_flag[n], abs_level_gtX_flag[n][0], par_level_flag[n], abs_level_gtx_flag[n][1] may not be additionally coded. In this case, |coeff[n]| may be coded/decoded into a preset dec_abs_level[n].

Rice Parameter Derivation Process of Level of Residual Coefficient

In a Rice parameter derivation process, color component information cIdx of a current transform block, a top left luma position (x0, y0) of the current transform coefficient, a scan position (xC, yC) of a current residual coefficient, and a width log2TbWidth and log2TbHeight of the current transform coefficient may be received and a Rice parameter cRiceParam may be output.

First, a variable locSumAbs may be derived from a pseudo code of Table 3 below.

TABLE 3

```
locSumAbs = 0
if( xC < (1 << log2TbWidth) - 1 ) {
  locSumAbs += AbsLevel[ xC + 1 ][ yC ] - sig_coeff_flag[ xC + 1 ][ yC ]
  if( xC <(1 << log2TbWidth) - 2 )
    locSumAbs += AbsLevel[ xC + 2 ][ yC ] - sig_coeff_flag[ xC + 2 ][ yC ]
  if( yC <(1 << log2TbHeight) - 1 )
    locSumAbs += AbsLevel[ xC + 1 ][ yC + 1] - sig_coeff_flag[ xC + 1 ][ yC + 1 ]
}
if( yC < (1 << log2TbHeight) - 1 ) {
  locSumAbs += AbsLevel[ xC ][ yC + 1] - sig_coeff_flag[ xC ][ yC + 1 ]
  if( yC <(1 << log2TbHeight) - 2 )
    locSumAbs += AbsLevelPass1 [ xC ][ yC + 2] - sig_coeff_flag[ xC ][ yC + 2 ]
}
if( locSumAbs > 31 )
  locSumAbs = 31
```

In addition, based on locSumAbs, cRiceParam may be derived as shown in Table 4.

TABLE 4

| locSumAbs | | | | | | | | | | | | | | | |
|---|---|---|---|---|---|---|---|---|---|---|---|---|---|---|---|
| 0 | 1 | 2 | 3 | 4 | 5 | 6 | 7 | 8 | 9 | 10 | 11 | 12 | 13 | 14 | 15 |
| cRiceParam | | | | | | | | | | | | | | | |
| 0 | 0 | 0 | 0 | 0 | 0 | 0 | 1 | 1 | 1 | 1 | 1 | 1 | 1 | 2 | 2 |
| locSumAbs | | | | | | | | | | | | | | | |
| 16 | 17 | 18 | 19 | 20 | 21 | 22 | 23 | 24 | 25 | 26 | 27 | 28 | 29 | 30 | 31 |
| cRiceParam | | | | | | | | | | | | | | | |
| 2 | 2 | 2 | 2 | 2 | 2 | 2 | 2 | 2 | 2 | 2 | 2 | 3 | 3 | 3 | 3 |

The Rice parameter derivation process may apply to a syntax element dec_abs_level[] and a syntax element abs_remainder[]. That is, the Rice parameter derivation process may commonly apply to a residual coefficient in a current transform block.

Binarization Process of Level of Residual Coefficient

The derived cRiceParam may be used to derive cMax in the binarization process of the corresponding syntax element. prefixVal of the corresponding syntax element may be determined to be the smaller value of cMax and the value of the corresponding syntax element. In addition, suffixVal of the corresponding syntax element may be determined to be a value obtained by subtracting a cMax value from the value of the corresponding syntax element. As described above, after prefixVal and suffixVal of the corresponding syntax element are determined, the binarization process may be performed for each of them and a binarized bin string of the corresponding syntax element may be generated. That is, the binarized bin string of the corresponding syntax element may be generated by concatenating a bin string (prefix bin string) of prefixVal and a bin string of suffixVal (if present).

Coding of Residual Signal, Whose Transform is Skipped

When transform of a residual signal is skipped, a process of coding the residual signal may be modified in consideration of statistical signal characteristics of a quantized residual signal in a spatial domain.

For example, coding of information on a last significant coefficient in the scan order in the transform block may be skipped. When transform is performed, energy is concentrated in a low frequency domain and a probability that 0 or an insignificant level appears in a high frequency domain is high. Therefore, when transform is performed, the position of the last significant coefficient may have an important meaning. However, when transform is skipped, a phenomenon that energy is concentrated in the low frequency domain does not occur. That is, when transform is skipped, since the significant coefficient is evenly distributed in a current transform block, the position of the last significant coefficient does not have an important meaning and thus may not be coded.

In addition, context modeling for sig_coeff_flag[] may be modified. The context model of a syntax element sig_coeff_flag[] may be derived by referring to a surrounding position of a current scanning position. In this case, the referenced surrounding position may be defined as a template. When transform is skipped, a template for determining the context model of a syntax element sig_coeff_flag[] may be modified to the left position NB0 and top position NB1 of the current scanning position. For example, a context increment ctxInc for determining the context model of a syntax element sig_coeff_flag[] may be derived based on sig_coeff_flag[NB0]+sig_coeff_flag[NB1]. That is, based on the sig_coeff_flag value at the left position of the current scanning position and the sig_coeff_flag value at the top position of the current scanning position, the context model of sig_coeff_flag at the current scanning position may be derived. Accordingly, the context model when transform is skipped may be determined independently of a diagonal direction. In addition, one of three context models may be determined.

In consideration of the distribution of the residual signal when transform is skipped, modification is necessary even in coding of a syntax element abs_remainder[]. As described above, for binarization of abs_remainder[], a Rice parameter may be derived. According to the pseudo code of Table 3, in order to derive the Rice parameter, it can be seen that a right position (xC+1, yC) and a bottom position (xC, yC+1) of a current scanning position are used as a template. However, when transform is skipped, similarly to the template of sig_coeff_flag, a left position (xC-1, yC) and top position (xC, yC-1) of a current scanning position (xC, yC) may be defined as a template for deriving the Rice parameter of abs_reminder[]. Alternatively, a Rice parameter for a transform-skipped residual signal may be fixed to a specific number. For example, rice parameter for the transform-skipped residual signal may be 1.

Context Model Derivation Process of Syntax Element Sig Coeff Flag

A syntax element may be coded/decoded using CABAC. In order to perform CABAC, a context model may be derived. The context model may be, for example, derived by determining a context index ctxIdx, and ctxIdx may be derived by a sum of a variable ctxIdxOffset and ctxInc. In this case, ctxInc may be derived using a template, as described above.

Specifically, in order to derive ctxInc of a syntax element sig_coeff_flag, variables locNumSig and locSumAbsPass1 may be derived according to a pseudo code of Table 5.

TABLE 5

```
locNumSig       = 0
locSumAbsPass1 = 0
if( transform_skip_flag[ xS ][ yS ] ) {
    if( xC > 0 ) {
        locNumSig       += sig_coeff_flag[ xC − 1 ][ yC ]
        locSumAbsPass1 += AbsLevelPass1[ xC − 1 ][ yC ]
    }
    if( yC > 0 ) {
        locNumSig       += sig_coeff_flag[ xC ][ yC − 1 ]
        locSumAbsPass1 += AbsLevelPass1[ xC ][ yC − 1 ]
    }
} else {
    if( xC < (1 << log2TbWidth) − 1 ) {
        locNumSig       += sig_coeff_flag[ xC + 1 ][ yC ]
        locSumAbsPass1 += AbsLevelPass1[ xC + 1 ][ yC ]
        if( xC <(1 << log2TbWidth) − 2 ) {
            locNumSig       += sig_coeff_flag[ xC + 2 ][ yC ]
            locSumAbsPass1 += AbsLevelPass1[ xC + 2 ][ yC ]
        }
        if( yC < (1 << log2TbHeight) − 1 ) {
            locNumSig       += sig_coeff_flag[ xC + 1 ][ yC + 1 ]
            locSumAbsPass1 += AbsLevelPass1[ xC + 1 ][ yC + 1 ]
        }
    }
    if( yC < (1 << log2TbHeight) − 1 ) {
        locNumSig       += sig_coeff_flag[ xC ][ yC + 1 ]
        locSumAbsPass1 += AbsLevelPass1[ xC ][ yC + 1 ]
        if( yC < (1 << log2TbHeight) − 2 ) {
            locNumSig       += sig_coeff_flag[ xC ][ yC + 2 ]
            locSumAbsPass1 += AbsLevelPass1[ xC ][ yC + 2 ]
        }
    }
}
```

As shown in Table 5, a template used in a process of deriving locNumSig and locSumAbsPass1 may vary according to transform_skip_flag. Specifically, when transform_skip_flag is 1 (transform is skipped), a left position (xC−1, yC) and top position (xC, yC−1) of a current scanning position (xC, yC) may be used as a template. ctxInc of a syntax element sig_coeff_flag may be derived based on locNumSig and/or locSumAbsPass1. That is, a template used for context modeling of sig_coeff_flag may be differently determined depending on whether transform is skipped.

As described above, BDPCM is applicable in a process of coding a residual block whose transform is skipped. When applying BDPCM, as described above, instead of coding a (quantized) residual coefficient, since a difference generated by performing prediction between residual coefficient on a line-by-line basis in a row or column direction is encoded, it may have characteristics different from other residual signals whose transform is skipped. For example, in the case where continuous residual values in one line are (3, 3, 4, 3), when applying BDPCM, actually transmitted residual values are (3, 0, 1, −1), such that the level may be significantly reduced and the sign may also be changed. Accordingly, it is necessary to select a separate context model to accumulate statistical properties suitable for BDPCM and to adaptively apply a method of deriving a Rice parameter used when binarizing the level of a residual coefficient.

As described above, neighboring pixels may be referenced to determine a context model of sig_coeff_flag or to derive a Rice parameter for binarization of abs_remainder. In this case, the referenced neighboring pixel (or position) may be defined as a template. When transform is skipped, a left position and top position of a current pixel (current scanning position) may be referenced as a template. In case a current pixel is located at the uppermost or leftmost position in a block, only an available neighboring pixel may be referenced as a template. Whether an unavailable neighboring pixel position is a non-zero or level value thereof may be initialized to 0. When the position of the current pixel is (0, 0), since no pixel can be referenced, Whether a neighboring pixel position is a non-zero or level value thereof may be derived as 0.

Figure 22:
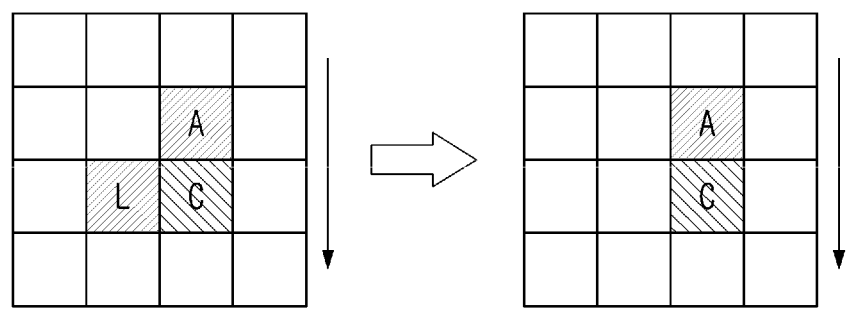
FIGS. 22 and 23 are views illustrating a template for a block to which BDPCM applies, according to an embodiment of the present disclosure.
Figure 23:
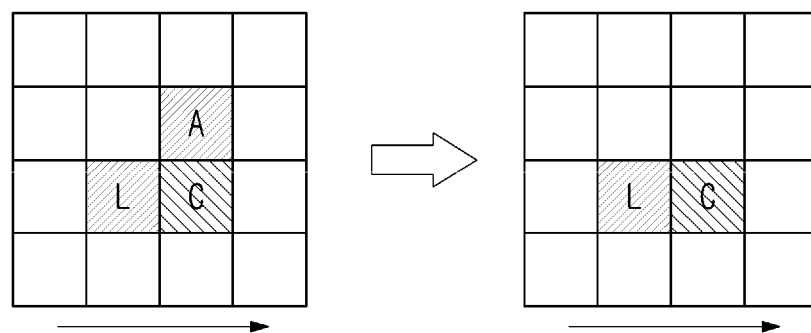

FIGS. 22 and 23 are views illustrating a template for a block to which BDPCM applies, according to an embodiment of the present disclosure.

In FIGS. 22 and 23, "C" indicates a current pixel and "A" and "L" respectively indicate a top neighboring pixel and a left neighboring pixel. In addition, an arrow shown on the right side of the block of FIG. 22 indicates that the prediction direction of BDPCM is a vertical direction and an arrow shown at the bottom of the block of FIG. 23 indicates the prediction direction of BDPCM is a horizontal direction.

In order to code a residual signal of a block whose transform is skipped, as shown in the blocks shown on the left side of FIGS. 22 and 23, a left pixel L and top pixel A of a current pixel may be referenced as a template. For example, the template may be a template when the Rice parameter of abs_remainder[] is derived and when the context model of sig_coeff_flag is derived.

When a block whose transform is skipped, is a block predicted by BDPCM, the template may be modified based on the prediction direction of BDPCM. For example, when the prediction direction of BDPCM is a vertical direction, as shown in the block shown on the right side of FIG. 22, only the top pixel A of the current pixel C may be referenced as a template. In addition, when the prediction direction of BDPCM is a horizontal direction, as shown in the block on the right side of FIG. 23, only the left pixel P of the current pixel C may be referenced as a template. That is, for a current pixel position (coefficient, residual coefficient or quantized residual coefficient position), in consideration of the prediction direction of BDPCM, a pixel at a unreferenced position may not be used as a template for checking similarity with the surroundings (neighbor position for context model selection or rice parameter derivation). In this case, for example, based on a current coefficient position, a reference sample located in the prediction direction of BDPCM may be used as a template and a reference sample not located in the prediction direction of BDPCM may not be used as a template.

Figure 24:
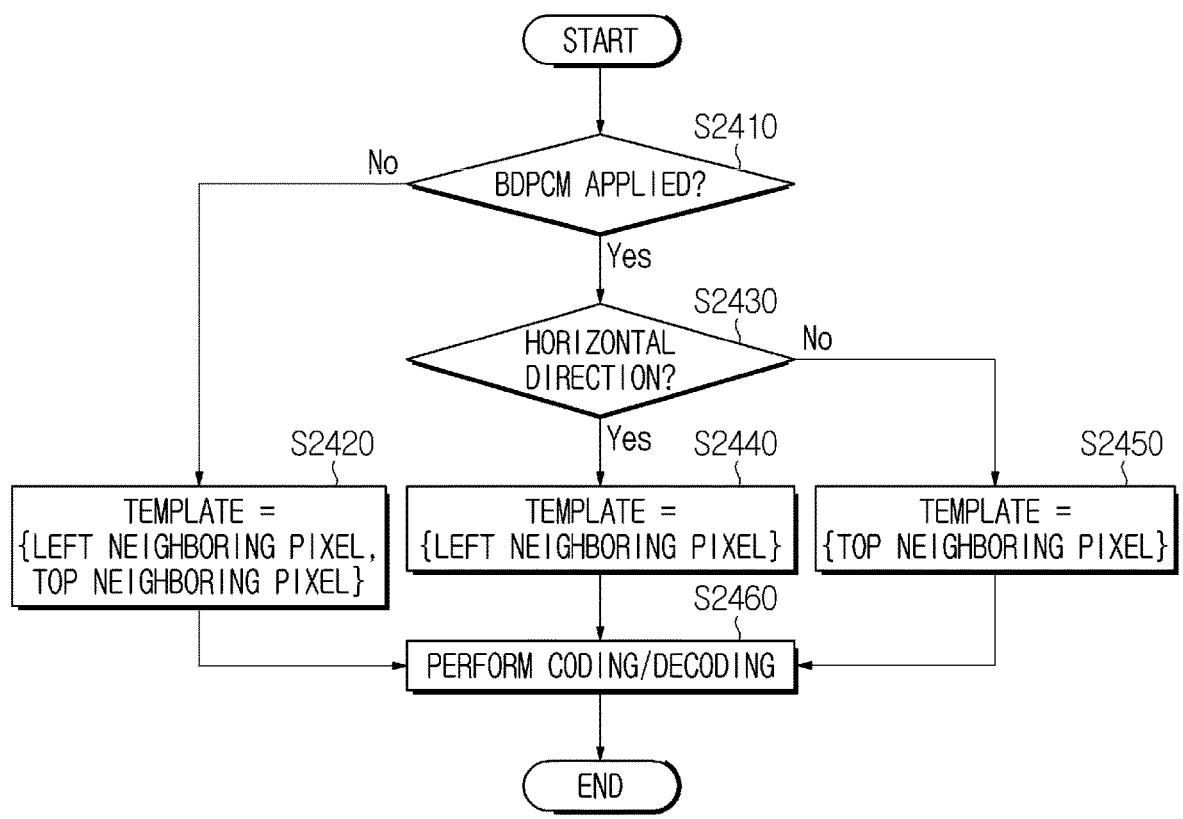
FIG. 24 is a flowchart illustrating a method of defining a template in consideration of a prediction direction of BDPCM and deriving a context model or Rice parameter according to the present disclosure.

FIG. 24 is a flowchart illustrating a method of defining a template in consideration of a prediction direction of BDPCM and deriving a context model or Rice parameter according to the present disclosure.

As shown in FIG. 24, it may be determined whether BDPCM applies to a current block whose transform is skipped (S2410), and, when BDPCM does not apply, a left neighboring pixel and top neighboring pixel of a current pixel may be defined as a template (S2420). When BDPCM applies to the current block, the prediction direction of BDPCM is determined (S2430), the left neighboring pixel of the current pixel may be defined as a template in the case of a horizontal direction (S2440), and the top neighboring pixel of the current pixel may be defined as a template in the case of a vertical direction (S2450). As described above, coding/decoding may be performed using the template of the current pixel defined based on whether BDPCM applies to the current block whose transform is skipped and/or the prediction direction of BDPCM (S2460). Coding/decoding of step S2460 may be, for example, coding/decoding of the residual signal of the current pixel and may include a context model derivation process of the residual signal or a Rice parameter derivation process.

According to the embodiment described with reference to FIGS. 22 to 24, based on the prediction direction of BDPCM (e.g., bdpcm_dir_flag), which of neighboring pixels of the current pixel has higher correlation may be determined and this may be used as statistics of the neighboring pixels of the current pixel, thereby increasing coding efficiency.

Figure 25:
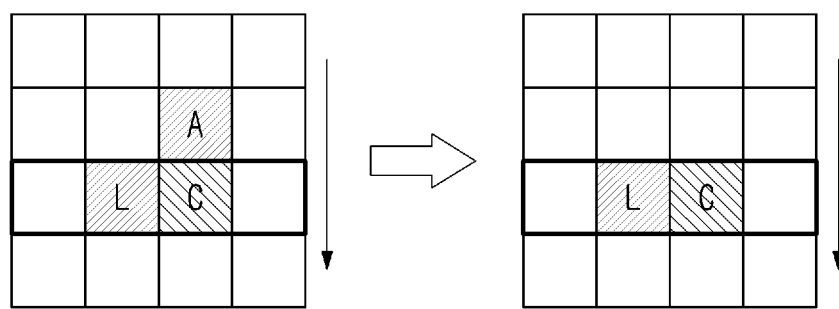
FIGS. 25 and 26 are views illustrating a template for a block to which BDPCM applies, according to another embodiment of the present disclosure.
Figure 26:
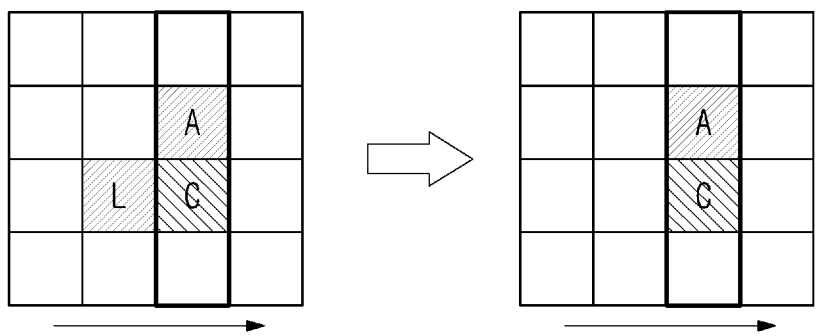

FIGS. 25 and 26 are views illustrating a template for a block to which BDPCM applies, according to another embodiment of the present disclosure.

In FIGS. 25 and 26, "C" indicates a current pixel and "A" and "L" respectively indicate a top neighboring pixel and a left neighboring pixel. In addition, an arrow shown on the right side of the block of FIG. 25 indicates that the prediction direction of BDPCM is a vertical direction and an arrow shown at the bottom of the block of FIG. 23 indicates the prediction direction of BDPCM is a horizontal direction. In addition, in FIGS. 25 and 26, a line denoted by a thick solid line indicates a BDPCM line where the current pixel is located.

In order to code a residual signal of a block whose transform is skipped, as shown in the blocks shown on the left side of FIGS. 25 and 26, a left pixel L and top pixel A of a current pixel may be referenced as a template. For example, the template may be a template when the Rice parameter of abs_remainder[] is derived and when the context model of sig_coeff_flag is derived.

When a block whose transform is skipped, is a block predicted by BDPCM, the template may be modified based on the prediction direction of BDPCM. For example, when the prediction direction of BDPCM is a vertical direction, as shown in the block shown on the right side of FIG. 25, only the left pixel L of the current pixel C may be referenced as a template. In addition, when the prediction direction of BDPCM is a horizontal direction, as shown in the block on the right side of FIG. 26, only the top pixel A of the current pixel C may be referenced as a template.

In the embodiment described with reference to FIGS. 25 and 26, a pixel which is not present on a same BDPCM line for a current pixel position may not be used as a template for checking similarity with the surroundings (neighbor position for context model selection or rice parameter derivation).

Figure 27:
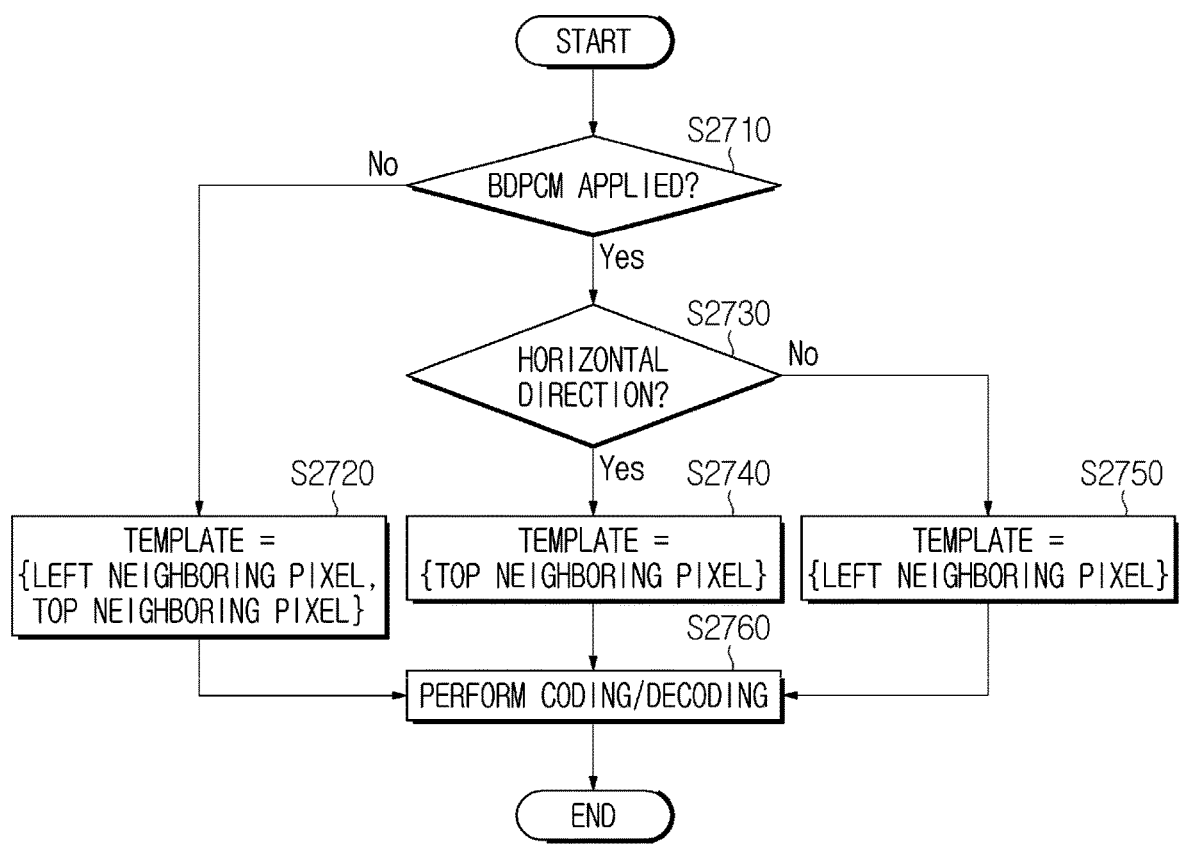
FIG. 27 is a flowchart illustrating a method of defining a template in consideration of a line of BDPCM and deriving a context model or Rice parameter according to the present disclosure.

FIG. 27 is a flowchart illustrating a method of defining a template in consideration of a line of BDPCM and deriving a context model or Rice parameter according to the present disclosure.

As shown in FIG. 27, it may be determined whether BDPCM applies to a current block whose transform is skipped (S2710), and, when BDPCM does not apply, a left neighboring pixel and top neighboring pixel of a current pixel may be determined as a template (S2720). When BDPCM applies to the current block, the prediction direction of BDPCM is determined (S2730), the top neighboring pixel of the current pixel may be defined as a template in the case of a horizontal direction (S2740), and the left neighboring pixel of the current pixel may be defined as a template in the case of a vertical direction (S2750). That is, a neighboring pixel present on the same BDPCM line as the current pixel may be defined as a template. As described above, coding/decoding may be performed using the template of the current pixel defined based on whether BDPCM applies to the current block whose transform is skipped and/or the prediction direction of BDPCM (S2760). Coding/decoding of step S2760 may be, for example, coding/decoding of the residual signal of the current pixel and may include a context model derivation process of the residual signal or a Rice parameter derivation process.

According to the embodiment described with reference to FIGS. 25 to 27, based on the prediction direction of BDPCM (e.g., bdpcm_dir_flag), which of neighboring pixels of the current pixel has higher correlation may be determined and this may be used as statistics of the neighboring pixels of the current pixel, thereby increasing coding efficiency.

Figure 28:
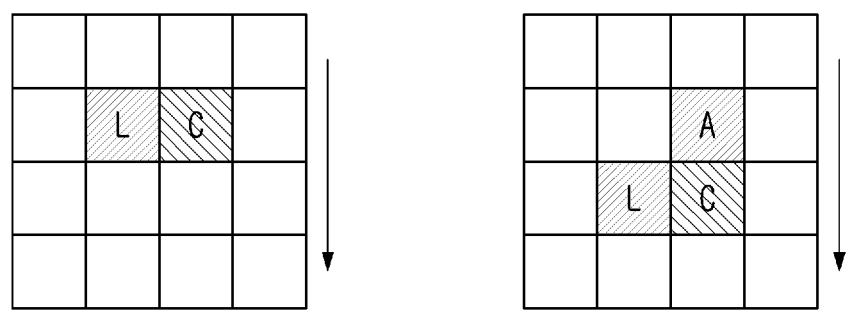
FIGS. 28 and 29 are views illustrating a template for a block to which BDPCM applies, according to another embodiment of the present disclosure.
Figure 29:
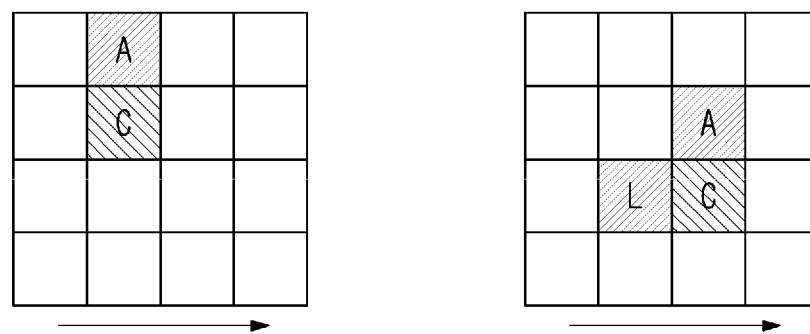

FIGS. 28 and 29 are views illustrating a template for a block to which BDPCM applies, according to another embodiment of the present disclosure.

In FIGS. 28 and 29, "C" indicates a current pixel and "A" and "L" respectively indicate a top neighboring pixel and a left neighboring pixel. In addition, an arrow shown on the right side of the block of FIG. 28 indicates that the prediction direction of BDPCM is a vertical direction and an arrow shown at the bottom of the block of FIG. 29 indicates the prediction direction of BDPCM is a horizontal direction.

A first value without a predicted value in DPCM or a value of a first line in BDPCM is not predicted and coded into the same as the existing value. However, from then on, a difference from the value of a previously coded line is encoded. Accordingly, the magnitude of the coded level may be very smaller than the level of the first line or may be 0. That is, it may have a characteristic that the level is very different between the pixel included in the first line and the pixel included in another line. That is, it may not be preferable that a neighboring pixel included in a first line is used as the template of a current pixel included after a second line.

In consideration of this, in the embodiments shown in FIGS. 28 and 29, according to the current pixel position and the prediction direction of BDPCM, a neighboring pixel included in the first line may not be used a template (neighbor position for context model selection or rice parameter derivation). That is, on the assumption that the first line of BDPCM is not available, the template may be defined. For example, in case of sig_coeff_flag, it may be determined whether the top pixel and left pixel of the current pixel is 0 or not and then, based on this, a context model is determined. In this case, since a possibility that a non-zero level is present in the first line is higher than another line, statistics may be adaptively accumulated depending on the neighboring pixel is a first line, thereby improving coding efficiency. Similarly, since the Rice parameter is derived based on the magnitude of the neighboring level of the current pixel, in case the current pixel is a second line, a non-differentiated level of the first line may not be referenced, thereby deriving a Rice parameter more suitable for the current coefficient.

As shown on the left side of FIG. 28, when the prediction direction of BDPCM is a vertical direction and the top pixel of the current pixel C belongs to the first line of BDPCM, only the left pixel L may be referenced as a template. As shown on the right side of FIG. 28, when the top pixel of the current pixel C does not belong to the first line of BDPCM, the top pixel A and the left pixel L may be referenced as a template.

Similarly, as shown on the left side of FIG. 29, when the prediction direction of BDPCM is a horizontal direction and the left pixel of the current pixel C belongs to the first line of BDPCM, only the top pixel A may be referenced as a template. As shown on the right side of FIG. 29, in case the left pixel of the current pixel C does not belong to the first line of BDPCM, the top pixel A and the left pixel L may be referenced as a template.

Figure 30:
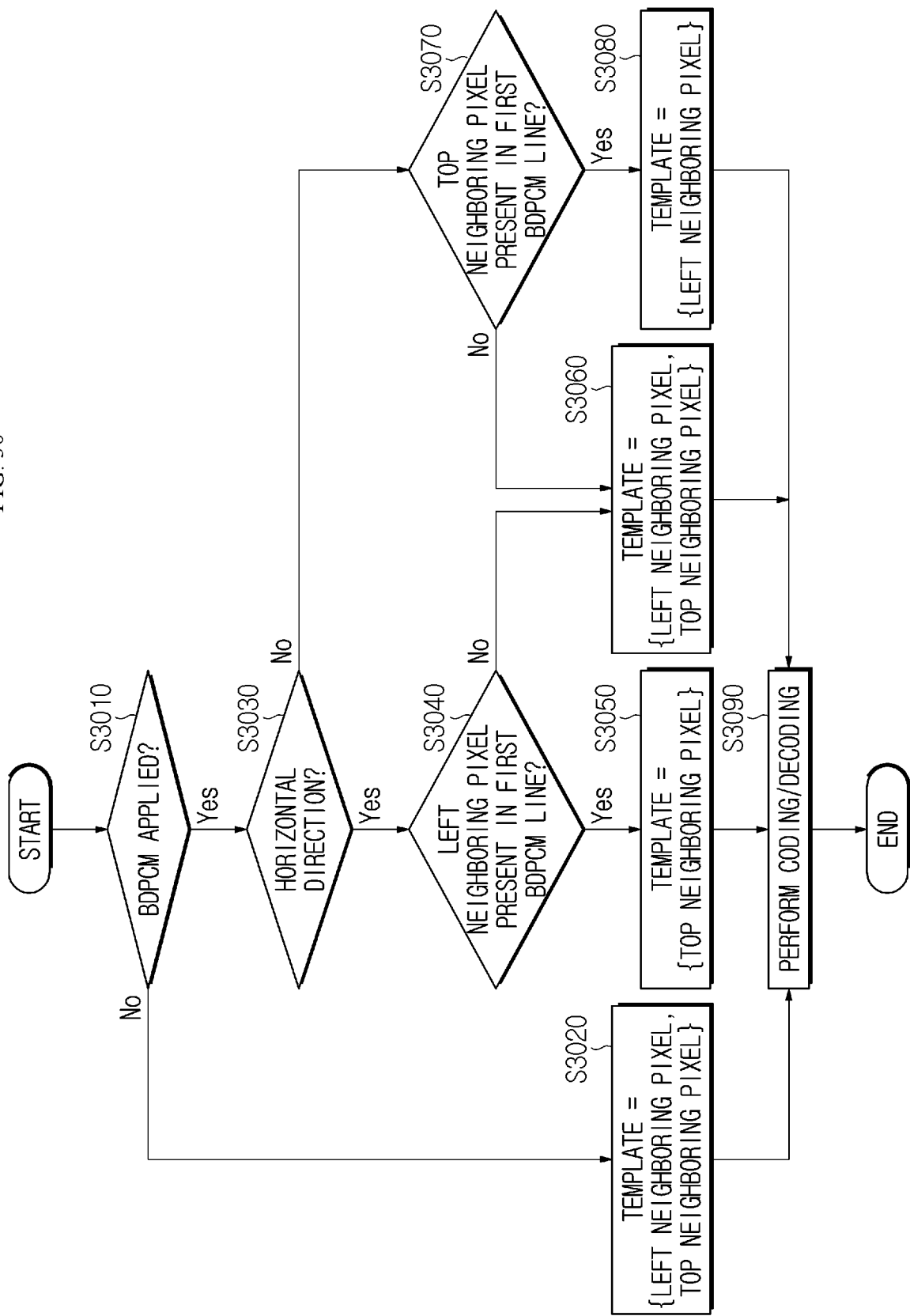
FIG. 30 is a flowchart illustrating a method of defining a template in consideration of whether a neighboring pixel is included in a first line of BDPCM and deriving a context model or Rice parameter according to the present disclosure.

FIG. 30 is a flowchart illustrating a method of defining a template in consideration of whether a neighboring pixel is included in a first line of BDPCM and deriving a context model or Rice parameter according to the present disclosure.

As shown in FIG. 30, it may be determined whether BDPCM applies to a current block whose transform is skipped (S3010), and, when BDPCM does not apply, a left neighboring pixel and top neighboring pixel of a current pixel may be defined as a template (S3020). When BDPCM applies to the current block, prediction direction of BDPCM may be determined (S3030). When the prediction direction of BDPCM is a horizontal direction, it may be determined whether the left neighboring pixel of the current pixel is present in the first line of BDPCM (S3040). When the left neighboring pixel of the current pixel is present in the first line of BDPCM, only the top neighboring pixel of the current pixel may be defined as a template (S3050). When the left neighboring pixel of the current pixel is not present in the first line of BDPCM, the left neighboring pixel and top neighboring pixel of the current pixel may be defined as a template (S3060). Similarly, when the prediction direction of BDPCM is a vertical direction, it may be determined whether the top neighboring pixel of the current pixel is present in the first line of BDPCM (S3070). When the top neighboring pixel of the current pixel is not present in the first line of BDPCM, the left neighboring pixel and top neighboring pixel of the current pixel may be defined as a template (S3060). When the top neighboring pixel of the current pixel is present in the first line of BDPCM, only the left neighboring pixel of the current pixel may be defined as a template (S3080). As described above, coding/decoding may be performed using the template of the current pixel defined based on whether BDPCM applies to the current block, the prediction direction of BDPCM and whether the neighboring pixel is present in the first line of BDPCM (S3090). Coding/decoding of step S3090 may be, for example, coding/decoding of the residual signal of the current pixel and may include a context model derivation process of the residual signal or a Rice parameter derivation process.

In the embodiment described with reference to FIGS. 28 and 30, since the template of the current pixel is defined based on whether the neighboring pixel of the current pixel is present in the first line of BDPCM, the statistical characteristics of the first line and subsequent lines of BDPCM may be reflected. Accordingly, a context model and Rice model more suitable for coding/decoding the current pixel may be derived.

Figure 31:
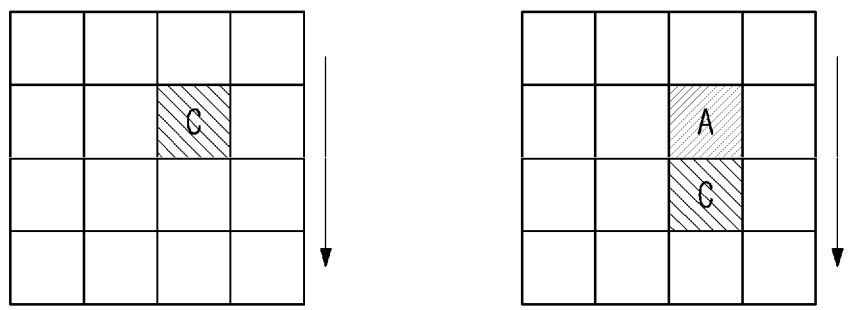
FIGS. 31 and 32 are views illustrating a template for a block to which BDPCM applies, according to another embodiment of the present disclosure.
Figure 32:
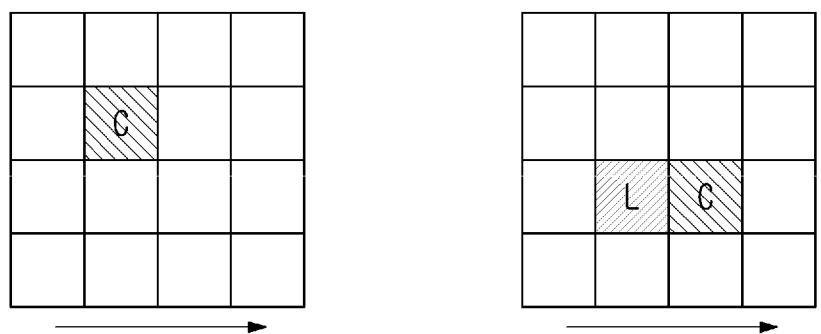

FIGS. 31 and 32 are views illustrating a template for a block to which BDPCM applies, according to another embodiment of the present disclosure.

In FIGS. 31 and 32, "C" indicates a current pixel and "A" and "L" respectively indicate a top neighboring pixel and a left neighboring pixel. In addition, an arrow shown on the right side of the block of FIG. 31 indicates that the prediction direction of BDPCM is a vertical direction and an arrow shown at the bottom of the block of FIG. 32 indicates the prediction direction of BDPCM is a horizontal direction.

The embodiment described with reference to FIGS. 31 and 32 is a combination of the embodiment described with reference to FIGS. 22 and 23 and the embodiment described with reference to FIGS. 28 and 29. That is, a neighboring pixel which is not referenced for prediction of BDPCM and a neighboring pixel included in the first line of BDPCM may not be used as a template.

Specifically, like the block shown on the left side of FIG. 31, when the prediction direction of BDPCM is a vertical direction, the top pixel of the current pixel C may be used as a template, however, since the top pixel of the current pixel C is included in the first line of BDPCM, both the left pixel and top pixel of the current pixel C may not be used as a template. In addition, like the block shown on the right side of FIG. 31, since the top pixel A of the current pixel C is not included in the first line of BDPCM, the top pixel A may be used as the template of the current pixel C.

Similarly, as shown in the block shown on the left side of FIG. 32, when the prediction direction of BDPCM is a horizontal direction, the left pixel of the current pixel C may be used as a template, however, since the left pixel of the current pixel C is included in the first line of BDPCM, both the left pixel and top pixel of the current pixel C may not be used as a template. In addition, as shown in the block shown on the right side of FIG. 32, since the left pixel L of the current pixel C is not included in the first line of BDPCM, the left pixel L may be used as the template of the current pixel C.

Figure 33:
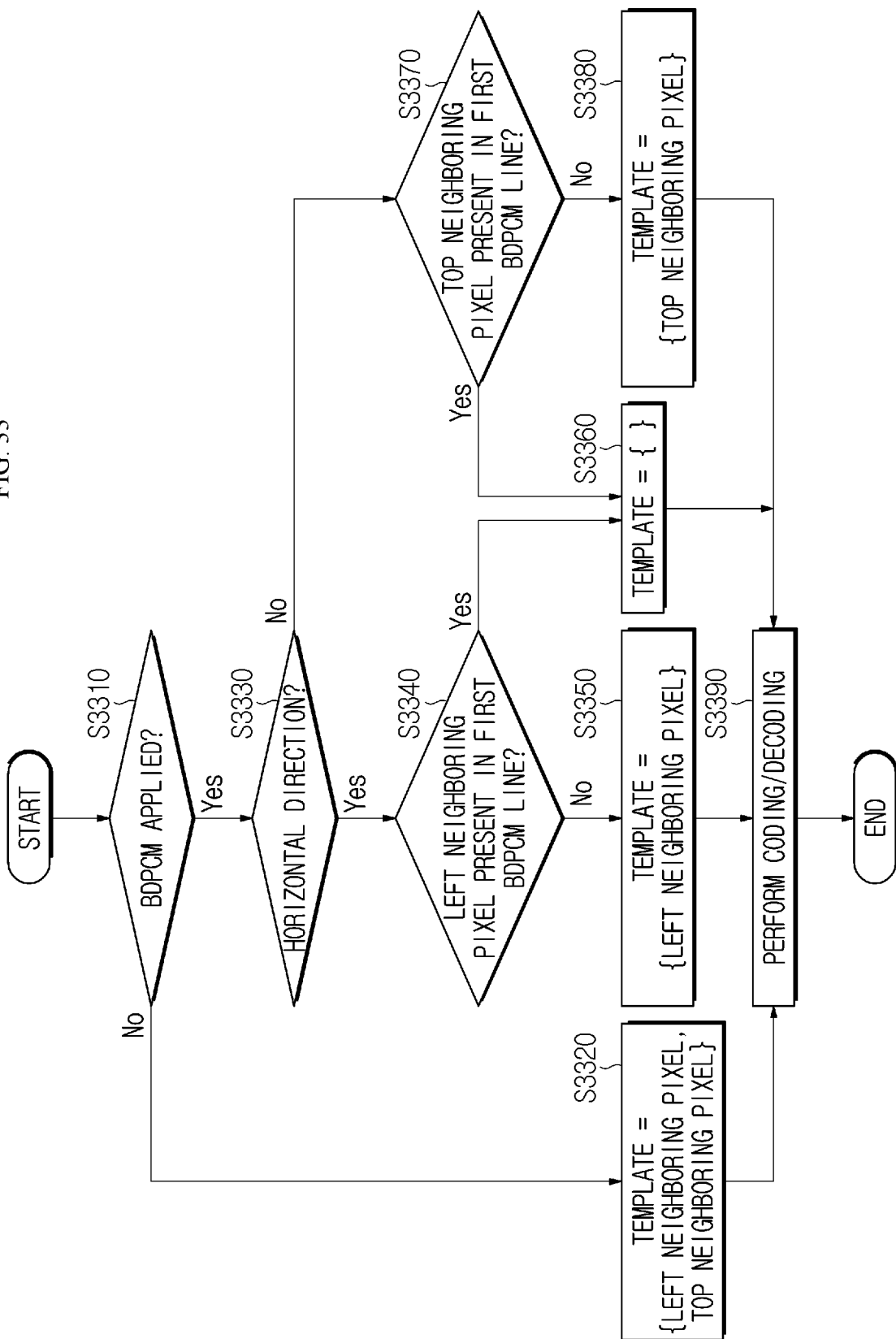
FIG. 33 is a flowchart illustrating a method of defining a template in consideration of a prediction direction of BDPCM and whether a neighboring pixel are included in a first line of BDPCM and deriving a context model or Rice parameter according to the present disclosure.

FIG. 33 is a flowchart illustrating a method of defining a template in consideration of a prediction direction of BDPCM and whether a neighboring pixel are included in a first line of BDPCM and deriving a context model or Rice parameter according to the present disclosure.

As shown in FIG. 33, it may be determined whether BDPCM applies to a current block whose transform is skipped (S 3310 ), and, when BDPCM does not apply, a left neighboring pixel and top neighboring pixel of a current pixel may be determined as a template (S3320). When BDPCM applies to the current block, the prediction direction of BDPCM is determined, (S3330). When the prediction direction of BDPCM is a horizontal direction, it may be determined whether the left neighboring pixel of the current pixel is present in the first line of BDPCM (S3340). When the left neighboring pixel of the current pixel is not present in the first line of BDPCM, the left neighboring pixel of the current pixel may be defined as a template (S3350). When the left neighboring pixel of the current pixel is present in the first line of BDPCM, both the left neighboring pixel and top neighboring pixel of the current pixel may not be defined as a template (S3360). Similarly, when the prediction direction of BDPCM is a vertical direction, it may be determined whether the top neighboring pixel of the current pixel is present in the first line of BDPCM (S3370). When the top neighboring pixel of the current pixel is not present in the first line of BDPCM, the top neighboring pixel of the current pixel may be defined as a template (S3380). When the top neighboring pixel of the current pixel is present in the first line of BDPCM, both the left neighboring pixel and top neighboring pixel of the current pixel may not be defined as a template (S3360). As described above, coding/decoding may be performed using the template of the current pixel defined based on whether BDPCM applies to the current block, the prediction direction of BDPCM and whether the neighboring pixel is present in the first line of BDPCM (S3390). Coding/decoding of step S3390 may be, for example, coding/decoding of the residual signal of the current pixel and may include a context model derivation process of the residual signal or a Rice parameter derivation process.

In the embodiment described with reference to FIGS. 31 and 33, since the template of the current pixel is defined based on the prediction direction of BDPCM and whether the neighboring pixel of the current pixel is present in the first line of BDPCM, the statistical characteristics of BDPCM may be better reflected. Accordingly, a context model and Rice model more suitable for coding/decoding of the current pixel may be derived.

In addition, according to another embodiment of the present disclosure, a combination of the embodiment described with reference to FIGS. 25 and 26 and the embodiment described with reference to FIGS. 28 and 29 may be performed. That is, a neighboring pixel which is not present in a same BDPCM line as a current pixel and a neighboring pixel included in the first line of BDPCM may not be used as a template.

Various embodiments of the neighboring pixel available as a template and the unavailable neighboring pixel have been described with reference to FIGS. 22 to 33. However, there may be an unavailable neighboring pixel according to the position of the current pixel. For example, when the left neighboring pixel or the top neighboring pixel is not present in the current block, the corresponding neighboring pixel may not be available as a template.

In the above-described various embodiments, the unavailable neighboring pixel may not be referenced or may be replaced with a predetermined value and be referenced. For example, whether the unavailable neighboring pixel position is a non-zero or level value thereof may be replaced with 0 and referenced.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some steps.

In the present disclosure, the image encoding apparatus or the image decoding apparatus that performs a predetermined operation (step) may perform an operation (step) of confirming an execution condition or situation of the corresponding operation (step). For example, in case it is described that predetermined operation is performed when a predetermined condition is satisfied, the image encoding apparatus or the image decoding apparatus may perform the predetermined operation after determining whether the predetermined condition is satisfied.

The various embodiments of the present disclosure are not a list of all possible combinations and are intended to describe representative aspects of the present disclosure, and the matters described in the various embodiments may be applied independently or in combination of two or more.

Various embodiments of the present disclosure may be implemented in hardware, firmware, software, or a combination thereof. In the case of implementing the present disclosure by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

In addition, the image decoding apparatus and the image encoding apparatus, to which the embodiments of the present disclosure are applied, may be included in a multimedia broadcasting transmission and reception device, a mobile communication terminal, a home cinema video device, a digital cinema video device, a surveillance camera, a video chat device, a real time communication device such as video communication, a mobile streaming device, a storage medium, a camcorder, a video on demand (VoD) service providing device, an OTT video (over the top video) device, an Internet streaming service providing device, a three-dimensional (3D) video device, a video telephony video device, a medical video device, and the like, and may be used to process video signals or data signals. For example, the OTT video devices may include a game console, a blu-ray player, an Internet access TV, a home theater system, a smartphone, a tablet PC, a digital video recorder (DVR), or the like.

Figure 34:
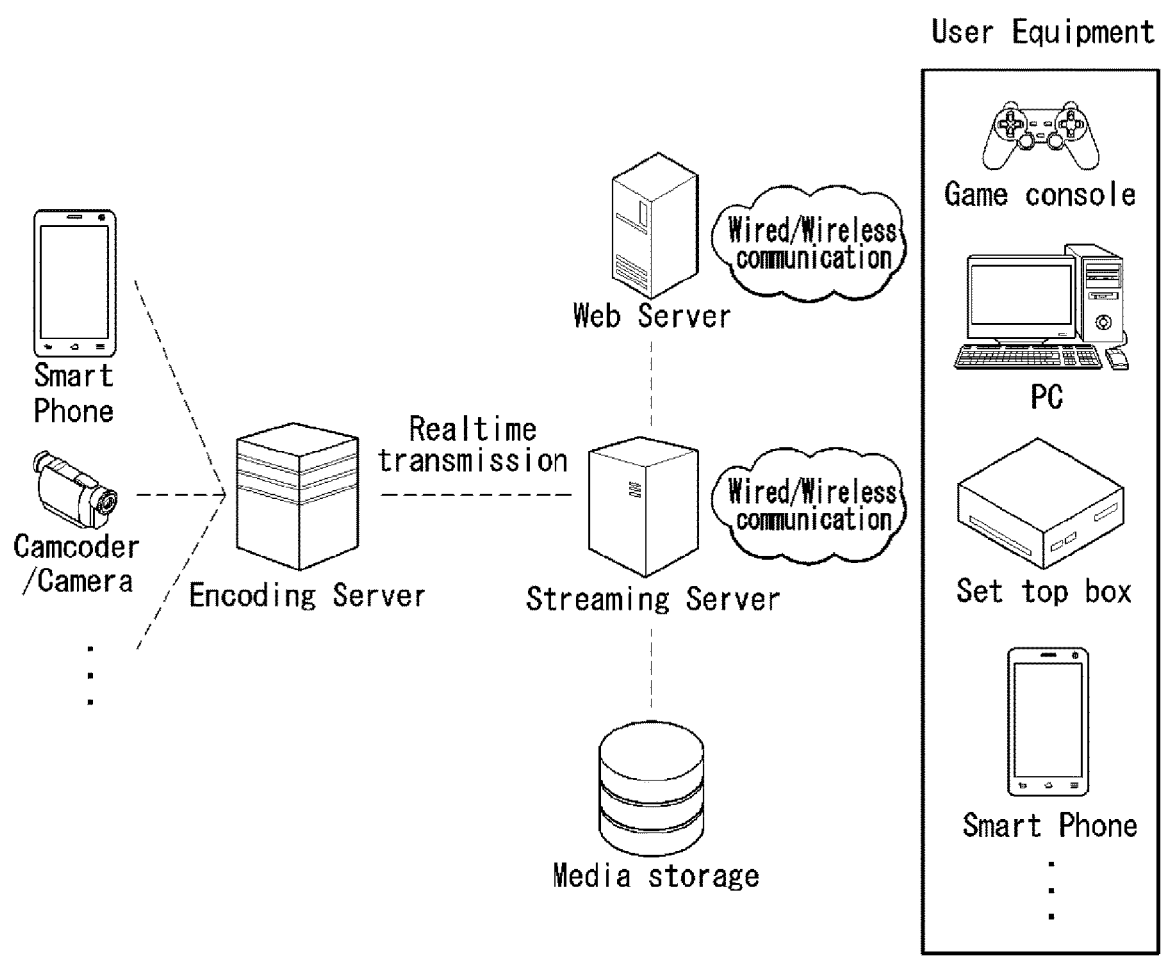
FIG. 34 is a view showing a content streaming system, to which an embodiment of the present disclosure is applicable.

FIG. 34 is a view showing a content streaming system, to which an embodiment of the present disclosure is applicable.

As shown in FIG. 34, the content streaming system, to which the embodiment of the present disclosure is applied, may largely include an encoding server, a streaming server, a web server, a media storage, a user device, and a multimedia input device.

The encoding server compresses content input from multimedia input devices such as a smartphone, a camera, a camcorder, etc. into digital data to generate a bitstream and transmits the bitstream to the streaming server. As another example, when the multimedia input devices such as smartphones, cameras, camcorders, etc. directly generate a bitstream, the encoding server may be omitted.

The bitstream may be generated by an image encoding method or an image encoding apparatus, to which the embodiment of the present disclosure is applied, and the streaming server may temporarily store the bitstream in the process of transmitting or receiving the bitstream.

The streaming server transmits the multimedia data to the user device based on a user's request through the web server, and the web server serves as a medium for informing the user of a service. When the user requests a desired service from the web server, the web server may deliver it to a streaming server, and the streaming server may transmit multimedia data to the user. In this case, the content streaming system may include a separate control server. In this case, the control server serves to control a command/response between devices in the content streaming system.

The streaming server may receive content from a media storage and/or an encoding server. For example, when the content are received from the encoding server, the content may be received in real time. In this case, in order to provide a smooth streaming service, the streaming server may store the bitstream for a predetermined time.

Examples of the user device may include a mobile phone, a smartphone, a laptop computer, a digital broadcasting terminal, a personal digital assistant (PDA), a portable multimedia player (PMP), navigation, a slate PC, tablet PCs, ultrabooks, wearable devices (e.g., smartwatches, smart glasses, head mounted displays), digital TVs, desktops computer, digital signage, and the like.

Each server in the content streaming system may be operated as a distributed server, in which case data received from each server may be distributed.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

The embodiments of the present disclosure may be used to encode or decode an image.

What is claimed is:

1. An image decoding method performed by an image decoding apparatus, the image decoding method comprising:
    parsing, from a bitstream, first information specifying whether block difference pulse code modulation (BDPCM) applies to an intra-predicted current block;
    determining a prediction direction of BDPCM for the current block and generating a residual block of the current block based on the determined prediction direction of BDPCM, based on the first information specifying that BDPCM applies to the current block;
    generating a prediction block of the current block, by performing intra prediction based on an intra prediction mode of the current block; and
    reconstructing the current block based on the residual block and the prediction block,
    wherein the prediction direction of BDPCM and a prediction direction of the intra prediction mode are the same.

2. The image decoding method of claim 1,
    wherein the first information is parsed only based on a non-zero residual signal being present in the current block, and
    wherein, based on the non-zero residual signal being not present in the current block, parsing of the first information is skipped and it is determined that BDPCM does not applies to the current block.

3. The image decoding method of claim 2, wherein whether the non-zero residual signal is present in the current block is determined based on information parsed from the bitstream.

4. The image decoding method of claim 1, wherein the prediction direction of BDPCM is determined based on second information parsed from the bitstream.

5. The image decoding method of claim 1, wherein the prediction direction of BDPCM is determined based on the intra prediction mode.

6. The image decoding method of claim 5,
    wherein the prediction direction of BDPCM is determined to be a vertical direction, based on the prediction direction of the intra prediction mode being a vertical direction,
    wherein the prediction direction of BDPCM is determined to be a horizontal direction, based on the prediction direction of the intra prediction mode being a horizontal direction, and
    wherein the prediction direction of BDPCM is determined to be a predetermined direction, based on the prediction direction of the intra prediction mode being a non-directional mode.

7. The image decoding method of claim 6, wherein the predetermined direction is a predefined direction or a direction derived based on information signaled at a higher level of the current block.

8. The image decoding method of claim 1, wherein the prediction direction of BDPCM is determined based on a size of the current block.

9. The image decoding method of claim 8, wherein, in case a width of the current block is W and a height is H,
    the prediction direction of BDPCM is determined to be a horizontal direction based on W being greater than H, and
    the prediction direction of BDPCM is determined to be a vertical direction based on H being greater than W.

10. The image decoding method of claim 8, wherein, in case a width of the current block is W and a height is H,
    the prediction direction of BDPCM is determined to be a vertical direction based on W/H being equal to or greater than a predetermined integer N, and
    the prediction direction of BDPCM is determined to be a horizontal direction based on W/H being equal to or less than 1/N.

11. An image decoding apparatus comprising:
    a memory; and
    at least one processor,
    wherein the at least one processor is configured to:
    parse, from a bitstream, first information specifying whether block difference pulse code modulation (BDPCM) applies to an intra-predicted current block;
    determine a prediction direction of BDPCM for the current block and generate a residual block of the current block based on the determined prediction direction of BDPCM, based on the first information specifying that BDPCM applies to the current block;
    generate a prediction block of the current block, by performing intra prediction based on an intra prediction mode of the current block; and
    reconstruct the current block based on the residual block and the prediction block,
    wherein the prediction direction of BDPCM and a prediction direction of the intra prediction mode are the same.

12. An image encoding method performed by an image encoding apparatus, the image encoding method comprising:
    determining whether block difference pulse code modulation (BDPCM) applies to a current block;
    determining a prediction direction of BDPCM for the current block based on BDPCM applying to the current block;
    generating a prediction block of the current block, by performing intra prediction, based on an intra prediction mode of the current block;
    generating a residual block of the current block based on the prediction block;
    encoding a residual block of the current block based on the determined prediction direction of BDPCM; and
    encoding first information specifying whether BDPCM applies to the current block, wherein the prediction direction of BDPCM and a prediction direction of the intra prediction mode are the same.

13. A method of transmitting a bitstream generated by the image encoding method of claim 12.

* * * * *